United States Patent
Yamasaki et al.

[11] Patent Number: 6,063,279
[45] Date of Patent: May 16, 2000

[54] WASTE WATER TREATMENT METHOD AND EQUIPMENT BEING ABLE TO TREAT HYDROGEN PEROXIDE, PHOSPHORUS, FLUORINE AND ORGANIC-MATTERS WITH HIGH EFFICIENCY

[75] Inventors: Kazuyuki Yamasaki, Hiroshima; Kazuyuki Sakata, Fukuyama; Atsushi Yokotani, Kurashiki; Noriyuki Tanaka, Fukuyama, all of Japan

[73] Assignee: Sharp Kabushiki Kaisha, Osaka, Japan

[21] Appl. No.: 09/132,144

[22] Filed: Aug. 10, 1998

[30] Foreign Application Priority Data

Sep. 18, 1997 [JP] Japan .................................. 9-253351

[51] Int. Cl.$^7$ ........................................ C02F 3/30
[52] U.S. Cl. .................. 210/605; 210/617; 210/630; 210/631
[58] Field of Search ...................... 210/603, 605, 210/617, 630, 631

[56] References Cited

U.S. PATENT DOCUMENTS

| | | | |
|---|---|---|---|
| 4,659,471 | 4/1987 | Molin et al. | 210/603 |
| 4,663,043 | 5/1987 | Molin et al. | 210/603 |
| 5,580,458 | 12/1996 | Yamasaki et al. | 210/631 |
| 5,707,514 | 1/1998 | Yamasaki et al. | 210/631 |
| 5,849,194 | 12/1998 | Yamasaki et al. | 210/617 |
| 5,895,576 | 4/1999 | Yamasaki et al. | 210/617 |

FOREIGN PATENT DOCUMENTS

| | | |
|---|---|---|
| 05253576 | 10/1993 | Japan . |
| 05254829 | 10/1993 | Japan . |
| 06091258 | 4/1994 | Japan . |
| 08057498 | 3/1996 | Japan . |

*Primary Examiner*—Christopher Upton
*Attorney, Agent, or Firm*—Nixon & Vanderhye P.C.

[57] ABSTRACT

In a third tank, calcium carbonate mineral is filled to react with fluorine in treatment water. Then, generated treatment water containing calcium fluoride is aerated and stirred so that aerobic microorganisms are propagated, by which organic matters are treated. A fourth water tank is to perform treatment of hydrogen peroxide by anaerobic microorganisms in return sludge from a sixth tank, treatment of phosphorus by slaked lime newly added in a small amount, and secondary treatment (advanced treatment) of fluorine that has already been primarily treated in the third tank. In a fifth tank, flocs are coagulated. In the sixth tank, the coagulants are settled and separated so as to be discharged as treated water. Thus, mixed waste water of hydrogen-peroxide- and phosphorus-containing fluorine waste water and organic-matter-containing waste water is treated simultaneously with low running cost and maintenance cost.

4 Claims, 13 Drawing Sheets

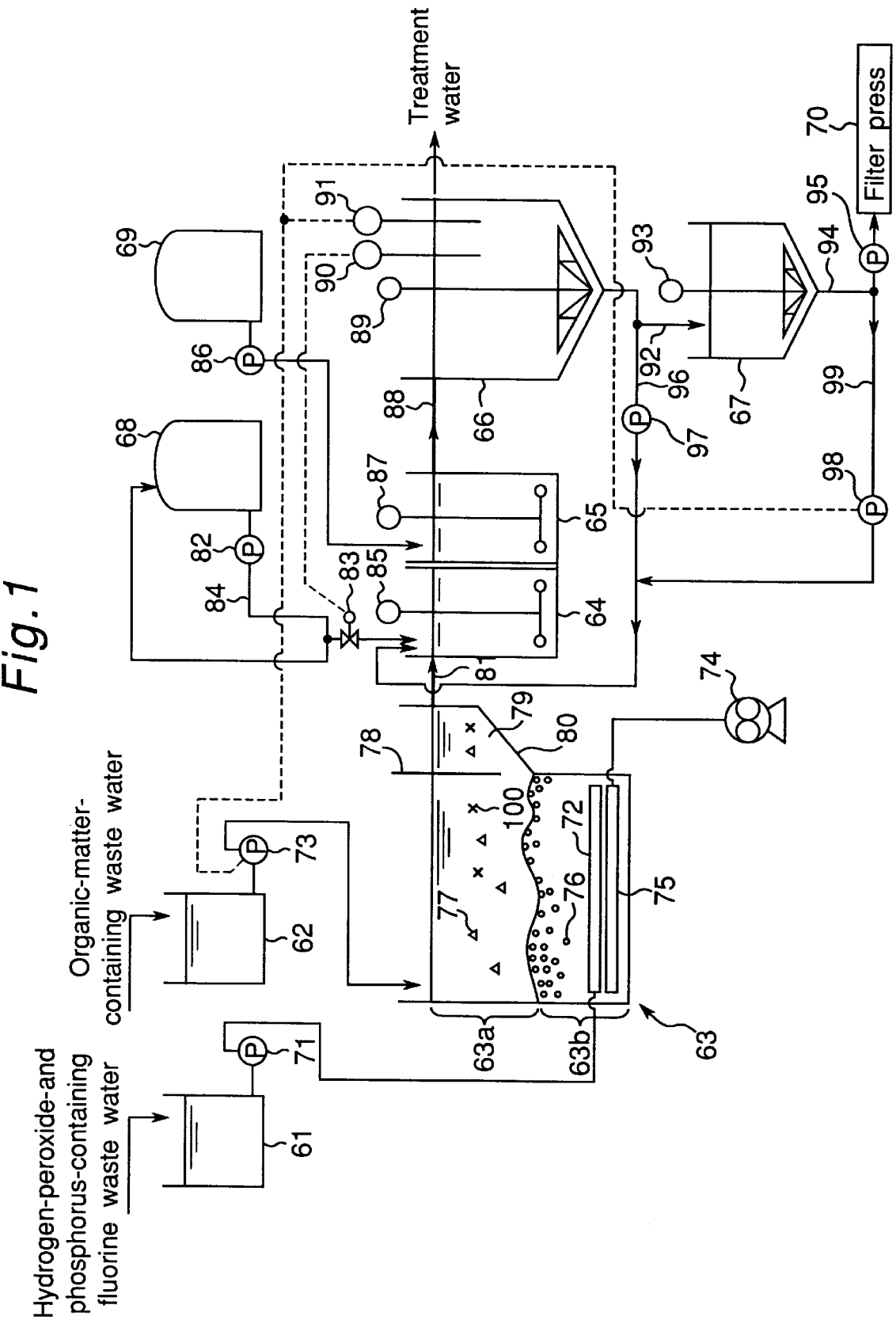

Fig. 2A

With normal concentrations of hydrogen peroxide, phosphorus and fluorine

| Tank | | Retention time | Timing (elapsed time) | | | | | | | | | | | |
|---|---|---|---|---|---|---|---|---|---|---|---|---|---|---|
| | | | 1hr | 2hr | 3hr | 4hr | 5hr | 6hr | 7hr | 8hr | 9hr | 10hr | 11hr | 12hr |
| Third water tank | Lower tank | 1hr | | | | | | | | | | | | |
| | Upper tank | 1hr | | | | | | | | | | | | |
| | Separation chamber | 30min | | | | | | | | | | | | |
| Fourth water tank (reaction tank) | | 45min | | | | | | | | | | | | |
| Fifth water tank (coagulating tank) | | 45min | | | | | | | | | | | | |
| Sixth water tank (settling tank) | | 3hr | | | | | | | | | | | | |
| Seventh water tank (thickening anaerobic microorganism culturing tank) | | 5hr | | | | | | | | | | | | |

Fig.2B

With low concentrations of hydrogen peroxide, phosphorus and fluorine

| Tank | | Retention time | Timing (elapsed time) |
|---|---|---|---|
| | | | 1hr / 2hr / 3hr / 4hr / 5hr / 6hr / 7hr / 8hr / 9hr / 10hr / 11hr / 12hr |
| Third water tank | Lower tank | 0.5hr | |
| | Upper tank | 0.5hr | |
| | Separation chamber | 15min | |
| Fourth water tank (reaction tank) | | 22.5min | |
| Fifth water tank (coagulating tank) | | 22.5min | |
| Sixth water tank (settling tank) | | 3hr | |
| Seventh water tank (thickening anaerobic microorganism culturing tank) | | 5hr | | ary
WASTE WATER TREATMENT METHOD AND EQUIPMENT BEING ABLE TO TREAT HYDROGEN PEROXIDE, PHOSPHORUS, FLUORINE AND ORGANIC-MATTERS WITH HIGH EFFICIENCY

BACKGROUND OF THE INVENTION

The present invention relates to waste water treatment methods, as well as waste water treatment equipment, for effectively and simultaneously treating waste water containing hydrogen peroxide, phosphorus and fluorine, and waste water containing organic matters, which are discharged from semiconductor factories, liquid crystal factories and the like.

From the viewpoint of the Water Pollution Control Law, waste water containing hydrogen peroxide and phosphorus in addition to fluorine needs to be treated until the fluorine as well as the hydrogen peroxide and phosphorus that increase the COD (Chemical Oxygen Demand) all come to specified concentrations. Also, the waste water, when containing organic matters, needs to be treated until the organic matters come to a specified concentration.

In this connection, the removal of fluorine is required to meet the regulation value of fluorine concentration. Also, the removal of hydrogen peroxide and organic matters is required to decrease the COD as a regulation value in the treatment water. Further, phosphorus, which causes the red tide, needs to be treated securely until it falls within the regulation value.

Conventionally, in the semiconductor factories and the like, mixed waste water with pH 2–3 containing hydrogen peroxide and phosphorus in addition to fluorine has been treated in the following way. That is, first, fluorine and phosphorus are chemically neutralized with chemicals of slaked lime or the like. After the fluorine and phosphorus have thus been neutralized, sodium bisulfite is added to the treatment water so that hydrogen peroxide is treated by reduction. Otherwise, the treatment water is treated by using a catalyst such as activated carbon or charcoal.

Meanwhile, as fluorine removal equipment for removing fluorine in waste water, one as shown in FIG. 8 is available. In this fluorine removal equipment, fluorine-containing waste water is passed through two calcium carbonate charged tanks 1, 2 so that outflow water of the calcium carbonate charged tank 2 is introduced to a circulation tank 3. Then, the treatment water in the circulation tank 3 is introduced to membrane separation equipment 4, where the treatment water is separated into concentrated water, which contains calcium carbonate crystals flowed out from the latter-stage calcium carbonate charged tank 2, and permeated water. After that, the separated concentrated water is returned to the circulation tank 3. Also, part of the concentrated water is returned to the former-stage calcium carbonate charged tank 1. The permeated water is discharged to a water storage tank 5.

According to this fluorine removal equipment, the fluorine in the waste water reacts with calcium carbonate in the calcium carbonate charged tanks 1, 2, resulting in calcium fluoride. Then, after a specified treatment period has elapsed, the calcium fluoride is pulled out from the calcium carbonate charged tanks 1, 2. Thus, fluorine is removed as calcium fluoride.

As another fluorine removal equipment, calcium fluoride collection equipment as shown in FIG. 9 is available. In this calcium fluoride collection equipment, calcium carbonate in a calcium carbonate silo 7 is added to fluorine-containing solution in a calcium carbonate reaction tank 6. Then, through 50° C.–100° C. high temperature treatment and high-temperature aeration process (or high-temperature pressure reducing deaeration process), calcium fluoride is collected. In addition, reference numeral 8 denotes a blower for aeration, and 9 denotes an air diffuser.

Further, as waste water treatment equipment for treating fluorine waste water containing organic matters, one as shown in FIG. 10 is available. In this waste water treatment equipment, calcium carbonate mineral as a filler material is fluidized strongly or weakly so that both fluorine and organic matters in the treatment water are removed by making good use of chemical reaction and biological reaction of aerobic microorganisms. In addition, reference numeral 11 denotes a first water tank, 12 denotes a second water tank (settling tank), 13 denotes a third water tank (sludge thickening tank), 14 denotes a polyaluminum chloride tank, 15, 16 denote scrapers, 17 to 19 denote blowers, 20 denotes a line mixer, 21 denotes a diffuser, and 22, 23 denote air diffusers. Further, 24a to 24c denote calcium carbonate mineral, 25 denotes inorganic sludge, and 26 denotes microbial sludge.

Further, waste water treatment equipment as shown in FIG. 11 is designed to treat organic-matter-containing fluorine waste water by means of calcium carbonate mineral. In this waste water treatment equipment, the calcium carbonate mineral particles are to be used all in immobilized state. Accordingly, calcium fluoride resulting from reaction of fluorine in the waste water with calcium would remain between immobilized calcium carbonate mineral particles, being present as lumps for a long time. Then, the lumps would grow increasingly larger so as to spread fully in the whole tank, with the result of lowered treatment efficiency. In addition, reference numeral 31 denotes a first reaction adjustment tank, 32 denotes a second reaction adjustment tank, 33 denotes a third water tank (reaction coagulating tank), 34 denotes a fourth water tank (settling tank), 35 denotes a fifth water tank (sludge thickening tank), 36 denotes a filter press, 37, 38 denote water diffusers, 39 to 41 denote blowers, 42, 43 denote air diffusers, and 44, 45 denote scrapers. Further, 46 denotes calcium carbonate mineral, 47 denotes charcoal and 48 denotes a plastic filler material.

Meanwhile, as hydrogen peroxide removal equipment for removing hydrogen peroxide in waste water, there has been available one using granular activated carbon as a catalyst as shown in FIG. 12. This hydrogen peroxide removal equipment has a catalyst part 52 and a settling part 53 in a treatment tank 51. Then, for operation, granular activated carbon is previously charged in the catalyst part 52 at a ratio of 1% to 35% of the effective capacity of the tank. Besides, hydrogen-peroxide-containing waste water is introduced into the treatment tank 51 through a supply port 54. Then, this hydrogen-peroxide-containing waste water permeates into the catalyst part 52, soon filling the interior of the catalyst part 52. On the other hand, the hydrogen-peroxide-containing waste water is introduced into the catalyst part 52 also through a horizontal supply port 55. As a result, a whirling current occurs inside the catalyst part 52, so that the hydrogen-peroxide-containing waste water makes contact with the granular activated carbon so as to be decomposed into water and oxygen through the catalytic action of the activated carbon.

The waste water after the decomposing process overflows the catalyst part 52 to flow into the settling part 53, being discharged through a discharge port 56. In this process, granular activated carbon that has flowed from the catalyst part 52 into the settling part 53 along with the waste water stays within the settling part 53 for a while and settles down, being returned into the catalyst part 52 through an opening 57. Therefore, only supernatant water is discharged through the discharge port 56 of the settling part 53.

This type of hydrogen peroxide removal equipment is used as hydrogen peroxide removal equipment for cases where hydrogen peroxide waste water is discharged alone from production rooms of semiconductor factories. Also, when hydrogen peroxide waste water mixed with phosphorus-containing fluorine waste water is discharged from production rooms, the hydrogen peroxide removal equipment is used in a stage preceding phosphorus-containing fluorine waste water removal equipment as follows:

mixed waste water→hydrogen peroxide removal equipment by activated carbon→phosphorus-containing fluorine waste water removal equipment by slaked lime and coagulants→treated waste water.

As described above, fluorine-containing waste water discharged in common semiconductor factories where integrated circuits are manufactured has hydrogen peroxide and phosphorus mixed therein. In some other cases, the waste water may be mixed with surface active agents, alcohol, IPA (isopropyl alcohol), acetone or other organic matters. Among such cases, there are some cases where IPA or acetone may be discharged alone. As the reason of this mixing, it could be said that hydrofluoric acid, hydrogen peroxide, phosphoric acid, IPA, acetone and the like are generally used for semiconductor manufacturing processes, where these chemicals are often handled in a clean bench of the same process so that the chemicals may be mixed in fluorine-containing waste water that is discharged in a relatively large discharge amount.

As described above, the most general method for treating the fluorine-containing waste water in which hydrogen peroxide and phosphorus are mixed is to add slaked lime and coagulants and thereby neutralize fluorine and phosphorus. However, with this neutralizing treatment of fluorine and phosphorus by slaked lime or the like, when the fluorine concentration in the treatment water is lowered to the first digit, the aimed fluorine concentration could not be reached without charging extra quantity of slaked lime or coagulants, so that unreacted slaked lime would flow into the settling tank, resulting in increase in generated sludge. This would cause problems of not only increase in generated sludge due to the excessive addition of slaked lime but also increase in costs. Further, because sodium bisulfite is added during the hydrogen peroxide treatment in addition to the excessive addition of slaked lime, the electrical conductivity of the treatment water would increase. Accordingly, there is a further problem that the obtained treated water could not be recycled for the production of ultrapure water.

Thus, as a method for reducing the amount of sludge generated during the treatment of fluorine-containing waste water, there has been developed a method of removing fluorine as calcium fluoride by using calcium carbonate as described before. Moreover, as an advancement of this method, there has been developed a method of removing fluorine and organic matters in the treatment water with the use of calcium carbonate mineral and by using chemical reaction and biological reaction by microorganisms as described before. However, by the former method, hydrogen peroxide, phosphorus and organic matters could not be removed simultaneously with fluorine. Also, by the latter method, hydrogen peroxide and phosphorus could not be treated in itself, disadvantageously.

As equipment for removing hydrogen peroxide in waste water, there has been available hydrogen peroxide removal equipment as shown in FIG. 12. However, since this hydrogen peroxide removal equipment removes hydrogen peroxide by using the treatment with a catalyst of activated carbon and chemicals, there are problems of increases in running cost and initial cost. Furthermore, this hydrogen peroxide removal equipment could not remove fluorine, phosphorus and organic matters.

In addition, as described above, this hydrogen peroxide removal equipment can be used in the former stage of phosphorus-containing fluorine waste water removal equipment in order to treat the waste water in which phosphorus-containing fluorine waste water is mixed in the hydrogen peroxide waste water. This two-stage treatment unfortunately has the following problems.

That is, in general common semiconductor factories, relatively large amounts of organic-matter-containing fluorine waste water are involved. Therefore, even on the assumption that the retention time in the hydrogen peroxide treatment equipment with catalysts of activated carbon or charcoal or the like (of large cost) installed in the former stage is one hour, the amount of retained water is large, causing the hydrogen peroxide treatment equipment to increase in size so that amounts of the activated carbon or charcoal or other chemicals as catalysts increase, resulting in enormous initial cost. Moreover, a large installation area would be required.

Also, since large amounts of retained water within the hydrogen peroxide treatment equipment are involved as described above, large fluctuations of water level in the hydrogen peroxide treatment equipment are involved. Then, because the specific gravity of activated carbon is close to 1, in some cases, a large fluctuation of water level causes part of the activated carbon would flow out so as to flow into the succeeding-stage phosphorus-containing fluorine waste water removal equipment. In this case, activated carbon would adhere to calcium fluoride generated within the calcium-carbonate-mineral-filled tank of the phosphorus-containing fluorine waste water removal equipment, so that calcium fluoride would not flow out from the calcium-carbonate-mineral-filled tank to the succeeding stage. Thus, as calcium fluoride with activated carbon adhering thereto is increasingly deposited, the treatment efficiency in the calcium-carbonate-mineral-filled tank would deteriorate.

In addition, as the preceding stage of the phosphorus-containing fluorine waste water removal equipment, it could be conceived to install equipment for treating hydrogen peroxide by using reducing agents such as sodium bisulfite. In this case, also unfortunately, the running cost would be an enormous one because of the large amount of treatment water. Moreover, a large installation area would be involved.

The above problems in installing the hydrogen peroxide removal equipment at the preceding stage of the phosphorus-containing fluorine waste water removal equipment apply also to the case where hydrogen peroxide and fluorine are continuously treated with activated carbon or charcoal filled in the calcium-carbonate-filled tank 1 of the fluorine removal equipment shown in FIG. 8.

An object of the present invention is therefore to provide waste water treatment method and waste water treatment equipment which can treat hydrogen peroxide, phosphorus-containing fluorine waste water and organic-matter-containing waste water with high efficiency and low cost, simultaneously.

In order to achieve the aforementioned object, there is provided a waste water treatment method characterized by decomposing hydrogen-peroxide-containing waste water by means of anaerobic microorganisms.

With this constitution, hydrogen peroxide as an oxidant is reduced and decomposed by the reducing force of anaerobic microorganisms. Thus, hydrogen peroxide is treated with simple equipment and with low cost without relying on high-priced sodium bisulfite or activated carbon.

Also, there is provided a waste water treatment method characterized by decomposing hydrogen-peroxide-containing waste water by means of mixed sludge of anaerobic microorganisms and inorganic sludge.

With this constitution, the anaerobic microorganisms are entrapped (entrappingly immobilized) by the inorganic sludge, so that the anaerobic microorganisms are protected from dying out by the hydrogen peroxide as an oxidant. Thus, the hydrogen peroxide is effectively decomposition treated by the protected anaerobic microorganisms.

In an embodiment of the present invention, the mixed sludge is sludge introduced from a thickened anaerobic microorganism culturing tank in which anaerobic microorganisms are thickened and cultured.

With this constitution, anaerobic microorganisms that perform decomposition treatment of the hydrogen peroxide are thickened and cultured in the thickening anaerobic microorganism culturing tank. Therefore, the hydrogen peroxide as an oxidant is decomposition treated further effectively by the anaerobic microorganisms having reducibility and high concentration.

In an embodiment of the present invention, the anaerobic microorganisms are bacteria principally comprising sulfate-reducing bacteria.

With this constitution, sulfate-reducing bacteria principally composing the anaerobic microorganisms are easily maintained being cultured and propagated by the anaerobic state being maintained, in hydrogen-peroxide-containing waste water derived from semiconductor factories in which sulfuric acid ions are present at all times.

Also, there is provided a waste water treatment method characterized in that, after introducing hydrogen-peroxide-containing waste water and organic-matter-containing waste water into a first tank, where the mixed waste water is aerated, and then biologically treating the organic matters by means of propagated aerobic microorganisms, introducing the waste water, which has undergone the treatment by the first tank, into a non-aerating second tank into which mixed sludge of anaerobic microorganisms and inorganic sludge has been introduced, and then biologically treating the hydrogen peroxide by means of the anaerobic microorganisms.

With this constitution, organic matters are biologically treated by aerobic microorganisms in the first tank, while hydrogen peroxide is biologically treated by anaerobic microorganisms in the second tank. Thus, both the hydrogen peroxide and the organic matters are biologically treated continuously.

Also, there is provided a waste water treatment method comprising:

a first step for introducing hydrogen-peroxide- and phosphorus-containing fluorine waste water to lower portion of a treatment tank in which reactive filler material has been fluidized in treatment water through aeration by aeration means, while introducing organic-matter-containing waste water to upper portion of the treatment tank so that fluorine is treated through chemical treatment by means of the reactive filler material, and further biologically treating organic matters by means of aerobic microorganisms propagated in a product of the chemical treatment;

a second step for introducing treatment water, which has undergone the first step, into a non-aerating reaction coagulating tank, adding an inorganic coagulant and a high molecular coagulant to thereby treat phosphorus through chemical treatment by the inorganic coagulant, and then coagulating a product of the chemical treatment; and a third step for introducing treatment water, which has undergone the second step, into a settling tank to thereby separate it into supernatant and sludge, and returning separated sludge to the reaction coagulating tank, wherein hydrogen peroxide is treated within the reaction coagulating tank by means of anaerobic microorganisms propagated in the returned sludge.

With this constitution, in the first step, fluorine is treated through chemical treatment by means of the reactive filler material, and further organic matters are biologically treated by means of aerobic microorganisms propagated in a product of the chemical treatment. Moreover, in the second step, phosphorus is treated through chemical treatment by the added inorganic coagulant, while hydrogen peroxide is treated by the anaerobic microorganisms in the sludge returned from the settling tank. Thus, hydrogen-peroxide- and phosphorus-containing fluorine waste water and organic-matter-containing waste water are simultaneously treated so that fluorine, phosphorus, hydrogen peroxide and organic matters in the treatment water are continuously treated and removed.

In an embodiment of the present invention, the reactive filler material is calcium carbonate mineral, and the inorganic coagulant is slaked lime.

With this constitution, fluorine in the hydrogen-peroxide- and phosphorus-containing fluorine waste water reacts with the calcium carbonate mineral to form calcium fluoride. Also, propagated aerobic microorganisms are entrapped and immobilized to the calcium fluoride, and protected from dying out by the hydrogen peroxide as an oxidant. Thus, organic matters in the organic-matter-containing waste water are decomposition treated effectively by the protected aerobic microorganisms. Then, phosphorus in the hydrogen-peroxide- and phosphorus-containing fluorine waste water is coagulated and settled as calcium phosphate by the added slaked lime. At the same time, residual fluorine is advancedly treated by the slaked lime. Thus, mass generation of sludge can be suppressed by not using slaked lime in the fluorine treatment.

In an embodiment of the present invention, the sludge to be returned is mixed sludge of biological sludge composed principally of the anaerobic microorganisms and calcium fluoride and the slaked lime.

With this constitution, anaerobic microorganisms in the biological sludge returned from the settling tank are entrapped and immobilized to calcium fluoride in the inorganic sludge so as to be protected from dying out by the hydrogen peroxide as an oxidant. Accordingly, when the mixed sludge of biological sludge and inorganic sludge is returned to the reaction coagulating tank, the decomposition treatment of the hydrogen peroxide in the reaction coagulating tank is carried out effectively.

Also, there is provided waste water treatment equipment comprising:

a first tank which has aeration means and to which hydrogen-peroxide-containing waste water and organic-matter-containing waste water are mixedly introduced; and a non-aerating second tank to which mixed sludge of anaerobic microorganisms and inorganic sludge is introduced and to which treatment water treated by the first tank is introduced, wherein organic matters are biologically treated by aerobic microorganisms propagated in the first tank, and hydrogen peroxide is biologically treated by the anaerobic microorganisms in the second tank.

With this constitution, organic matters are biologically treated by the aerobic microorganisms in the first tank, while hydrogen peroxide is biologically treated by the anaerobic microorganisms in the second tank. Thus, both the hydrogen peroxide and the organic matters are biologically treated continuously.

Also, there is provided waste water treatment equipment comprising:

a treatment tank which has aeration means and which is filled with a reactive filler material in a state that the reactive filler material is fluidized through aeration by the aeration means, where hydrogen-peroxide- and phosphorus-containing fluorine waste water is introduced to lower portion of the treatment tank while organic-matter-containing waste water is introduced to upper portion of the treatment tank so that fluorine is treated through chemical treatment by the reactive filler material, and further organic matters are biologically treated by aerobic microorganisms propagated in a product of the chemical treatment;

a non-aerating reaction coagulating tank to which treated water from the treatment tank is introduced and further an inorganic coagulant and a high molecular coagulant are added to thereby treat phosphorus through chemical treatment by the inorganic coagulant, and a product of the chemical treatment is reactively coagulated;

a settling tank to which treated water from the reaction coagulating tank is introduced so that sludge in the introduced treated water are settled and separated; and sludge returning means for returning the sludge settled and separated in the settling tank to the reaction coagulating tank, wherein hydrogen peroxide is treated within the reaction coagulating tank by means of anaerobic microorganisms propagated in the returned sludge.

With this constitution, in the treatment tank, fluorine in the hydrogen-peroxide- and phosphorus-containing fluorine waste water is treated through chemical treatment by the reactive filler material. Also, organic matters in the organic-matter-containing waste water are biologically treated by aerobic microorganisms propagated in a product of the chemical treatment. Further, phosphorus in the hydrogen-peroxide- and phosphorus-containing fluorine waste water is treated through chemical treatment by the added inorganic coagulant in the reaction coagulating tank. In the mean time, hydrogen peroxide in the hydrogen-peroxide- and phosphorus-containing fluorine waste water is treated by anaerobic microorganisms in the sludge returned from the settling tank by the sludge returning means. Thus, hydrogen-peroxide- and phosphorus-containing fluorine waste water and organic-matter-containing waste water are simultaneously treated, so that fluorine, phosphorus, hydrogen peroxide and organic matters in the treatment water are continuously treated and removed.

In an embodiment of the present invention, the reactive filler material is calcium carbonate mineral, and the inorganic coagulant is slaked lime.

With this constitution, fluorine in the hydrogen-peroxide- and phosphorus-containing fluorine waste water reacts with calcium carbonate mineral to form calcium fluoride. Also, propagated aerobic microorganisms are entrapped and immobilized to the calcium fluoride so as to be protected from dying out by the hydrogen peroxide as an oxidant. Thus, organic matters in the organic-matter-containing waste water are decomposition treated effectively by the protected aerobic microorganisms. Further, phosphorus in the hydrogen-peroxide- and phosphorus-containing fluorine waste water is coagulated and settled by slaked lime as calcium phosphate. At the same time, residual fluorine is advancedly treated by the slaked lime. Thus, mass generation of sludge is suppressed by not using slaked lime for the treatment of fluorine.

In an embodiment of the present invention, the sludge returned is mixed sludge of biological sludge composed principally of the anaerobic microorganisms and inorganic sludge composed principally of calcium fluoride and the slaked lime.

With this constitution, anaerobic microorganisms in the biological sludge returned from the settling tank are entrapped and immobilized to calcium fluoride in the inorganic sludge so as to be protected from dying out by the hydrogen peroxide as an oxidant. Therefore, when the mixed sludge of biological sludge and inorganic sludge is returned to the reaction coagulating tank, the decomposition treatment of the hydrogen peroxide in the reaction coagulating tank is carried out effectively.

In an embodiment of the present invention, the treatment tank is equipped with a separation chamber for separating the reactive filler material from the treatment water in which the reactive filler material has been fluidized.

With this constitution, the reactive filler material of larger specific gravity that is being fluidized through aeration by the aeration means, and microbial sludge of smaller specific gravity that has been generated through biological treatment with aerobic microorganisms are physically separated from each other by the separation chamber provided in the treatment tank. Thus, unreacted reactive filler material is kept staying in the treatment tank without being introduced to the succeeding-stage reaction coagulating tank together with the treatment water.

In an embodiment of the present invention, the waste water treatment equipment further comprises an inclined plate which is provided in the settling tank and which is inclined so as to interrupt water stream toward the vertical direction within the settling tank.

With this constitution, settlement of the sludge is accelerated by the inclined plate. Also, the anaerobic microorganisms are stuck and immobilized to the whole inclined plate, so that residual hydrogen peroxide and residual organic matters in the treatment water are advancedly treated.

In an embodiment of the present invention, the waste water treatment equipment further comprises:

a fluorine concentration meter which is placed in the settling tank and which measures fluorine concentration of the treatment water in the settling tank and then outputs a signal representing the measured fluorine concentration; and addition controlling means for controlling an addition amount of the inorganic coagulant to be added to the reaction coagulating tank based on the signal from the fluorine concentration meter.

With this constitution, according to the fluorine concentration of the treatment water in the settling tank, the inorganic coagulant in an amount necessary for the advanced treatment of residual fluorine in the reaction coagulating tank is added to the reaction coagulating tank according to the fluorine concentration of the treatment water in the settling tank. Thus, advanced treatment of residual fluorine is carried out with a necessary least amount of inorganic coagulant, allowing a reduction in the running cost and a reduction in the generation of sludge.

In an embodiment of the present invention, the waste water treatment equipment further comprises:

hydrogen peroxide concentration measuring means which is placed in the settling tank and which measures hydrogen peroxide concentration of the treatment water in the settling tank and then outputs a signal representing the measured hydrogen peroxide concentration; and organic-matter-containing waste water introduction controlling means for controlling an introduction amount of the organic-matter-containing waste water to be introduced to the treatment tank based on the signal from the hydrogen peroxide concentration measuring means.

With this constitution, the amount of organic-matter-containing waste water to be introduced to the treatment tank is controlled responsive to the hydrogen peroxide concentration of the treatment water in the settling tank, so that the amount of organic matters in the treatment tank is controlled. As a result, the amount of anaerobic microorganisms in the settling tank is controlled, so that the treatment water in the settling tank comes to a specified hydrogen peroxide concentration.

In an embodiment of the present invention, the waste water treatment equipment further comprises:

a thickening anaerobic microorganism culturing tank to which sludge settled and separated in the settling tank is introduced to thicken and culture anaerobic microorganisms propagated in the sludge;

sludge returning means for returning the thickened sludge in which anaerobic microorganisms have been thickened and cultured in the thickening anaerobic microorganism culturing tank;

hydrogen peroxide concentration measuring means which is placed in the settling tank and which measures hydrogen peroxide concentration of the treatment water in the settling tank and then outputs a signal representing the measured hydrogen peroxide concentration; and sludge return controlling means for controlling a return amount of the thickened sludge to be returned to the reaction coagulating tank based on a signal from the hydrogen peroxide measuring means.

With this constitution, the return amount of thickened sludge to be returned from the thickening anaerobic microorganism culturing tank to the reaction coagulating tank is controlled according to the hydrogen peroxide concentration of the treatment water in the settling tank so that the treatment water in the settling tank comes to a specified hydrogen peroxide concentration.

In an embodiment of the present invention, the waste water treatment equipment further comprises:

a filtering unit to which treated water from the settling tank to filter the treatment water;

a water softener to which treated water from the filtering unit is introduced to remove calcium ions in the treated water;

a reverse osmosis membrane unit to which treated water from the water softener to remove residual ions, residual organic matters, microorganisms and the like in the treated water; and an ultrapure water system to which treated water from the reverse osmosis membrane unit to produce ultrapure water.

With this constitution, fluorine in the hydrogen-peroxide- and phosphorus-containing fluorine waste water is treated without using any large amount of slaked lime and coagulant. accordingly, the electrical conductivity of the supernatant treatment water from which sludge has been settled and separated in the settling tank becomes not more than 700 $\mu$s/cm. Therefore, by the treatment water being penetrated successively through the filtering unit, the water softener and the reverse osmosis membrane unit, treated water having such a water quality as enables the production of ultrapure water by the ultrapure water system can be obtained.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is an arrangement view showing an example of the waste water treatment equipment according to the present invention;

FIGS. 2A and 2B are diagrams showing treatment timing charts by the waste water treatment equipment shown in FIG. 1;

DETAILED DESCRIPTION OF THE PREFERRED EMBODIMENTS

Figure 3:
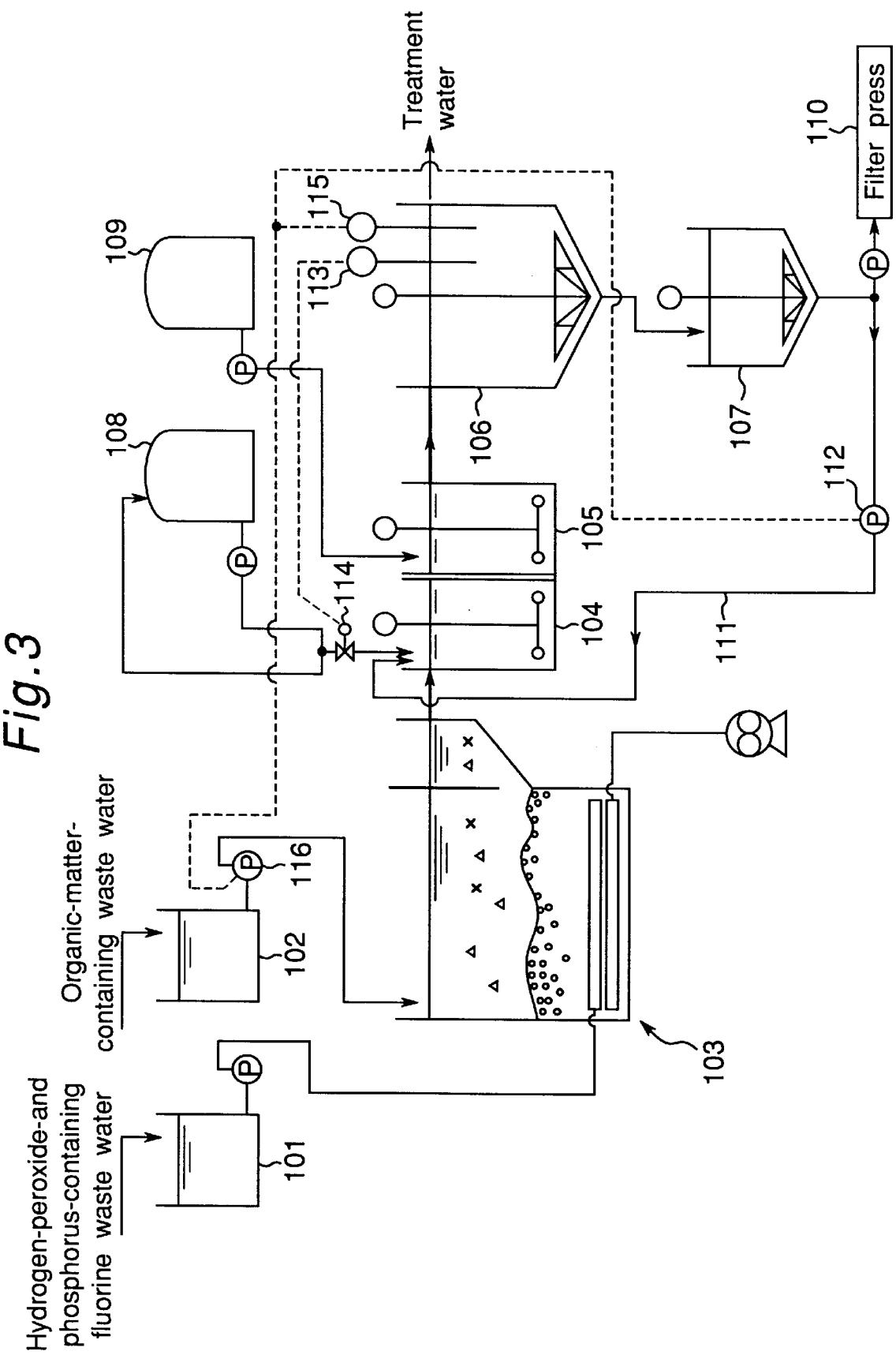
FIG. 3 is an arrangement view of waste water treatment equipment other than FIG. 1.

Hereinbelow, the present invention is described in more detail by embodiments.

(First Embodiment)

FIG. 1 is an arrangement view of waste water treatment equipment of this embodiment. This waste water treatment equipment is designed to simultaneously treat hydrogen-peroxide- and phosphorus-containing fluorine waste water as well as organic-matter-containing waste water, being capable of treating the hydrogen peroxide, phosphorus, fluorine and organic matters in the waste water adroitly and rationally with one system.

This waste water treatment equipment comprises a first water tank 61 into which the hydrogen-peroxide- and phosphorus-containing fluorine waste water is introduced and stored, a second water tank 62 into which the organic-matter-containing waste water is introduced and stored, a third water tank 63 for simultaneously treating the hydrogen-peroxide- and phosphorus-containing fluorine waste water and the organic-matter-containing waste water with the aid of calcium carbonate mineral, a fourth water tank 64 for causing treatment water derived from the third water tank 63 to react with slaked lime, a fifth water tank 65 serving as a coagulating tank which coagulates reaction products in the treatment water derived from the fourth water tank 64, a sixth water tank 66 serving as a settling tank which makes coagulant products in the treatment water derived from the fifth water tank 65 settle, and a seventh water tank 67 for thickening and culturing microorganisms in the sludge settled in the sixth water tank 66. Then, the waste water treatment equipment consists generally of the above seven water tanks 61 to 67, a slaked lime tank 68 and a filter press 70.

Into the first water tank 61, hydrogen-peroxide- and phosphorus-containing fluorine waste water is introduced and stored through piping from production equipment of the factory. Similarly, into the second water tank 62, organic-matter-containing waste water derived from the production equipment is introduced and stored. Then, the hydrogen-peroxide- and phosphorus-containing fluorine waste water is introduced by a first pump 71 into the third water tank 63 via an inlet pipe 72 set at the bottom portion of the third water tank 63. Also, into the third water tank 63, the organic-matter-containing waste water within the second water tank 62 is introduced by a second pump 73. In this way, division into the first water tank 61 and the second water tank 62 makes it possible to adjust the inlet amount of the hydrogen-peroxide- and phosphorus-containing fluorine waste water as well as organic-matter-containing waste water depending on the purpose.

The third water tank 63 comprises an upper tank 63a and a lower tank 63b. An air diffuser 75 connected to a blower 74 is set at the bottom of the lower tank 63b, and calcium carbonate mineral 76 is filled in the lower tank 63b. Then, as described before, the fluorine in the hydrogen-peroxide- and phosphorus-containing fluorine waste water introduced to the lower tank 63b of the third water tank 63 reacts with the calcium carbonate mineral 76 to form fine flocs of calcium fluoride 77.

Thus, the treatment water containing hydrogen peroxide, phosphorus and organic matters after the completion of fluorine treatment is introduced slowly from the lower tank 63b to the upper tank 63a. Then, the treatment water containing the generated calcium fluoride 77 is aerated and stirred with air derived from the air diffuser 75, by which aerobic microorganisms are propagated and the organic matters in the treatment water are treated through biological treatment by these aerobic microorganisms. The upper tank 63a has its top opened, a separation chamber 79 partitioned by a separating wall 78 so that the calcium carbonate mineral 76 and the calcium fluoride 77 are separated from each other is provided on one side of the upper tank 63a. Lower part of this separation chamber 79 is communicated with the upper tank 63a by an inclined wall 80.

The purpose of the separation chamber 79 is:
(1) to separate generated calcium fluoride 77 of small specific gravity and unreacted calcium carbonate mineral 76 of large specific gravity by making use of their difference in specific gravity; and
(2) to separate microbial sludge 100 of small specific gravity generated through biological treatment by the propagated aerobic microorganisms and the calcium carbonate mineral 76 of large specific gravity from each other.

The separation chamber 79 is connected to upper part of the fourth water tank 64 with an outflow pipe 81. The fourth water tank 64 is a reaction tank, to which slaked lime within the slaked lime tank 68 is supplied via loop piping 84 on which a pump 82 and a solenoid valve 83 are provided. Then, the supplied slaked lime reacts with phosphorus in the treatment water to generate calcium phosphate. Also, in the fourth water tank 64, hydrogen peroxide in the treatment water is treated by anaerobic microorganisms. Reference numeral 85 denotes a stirrer. The treatment water derived from the fourth water tank 64 serving as a reaction tank flows into the fifth water tank 65 serving as a coagulating tank. To the fifth water tank 65, high molecular coagulants in a high molecular coagulant tank 69 are supplied. Reference numeral 87 denotes a stirrer.

The fifth water tank 65 is connected to upper part of the sixth water tank 66 with an outflow pipe 88. The treatment water coagulated in the fifth water tank 65 serving as a coagulating tank is introduced to the sixth water tank 66 serving as a settling tank by an outflow pipe 88. A scraper 89 is set in the sixth water tank 66 so as to scrape up the settled sludge to the center of the bottom part. Then, the treatment water separated from the sludge is taken out as final treatment water treated this waste water treatment equipment. Also, a fluorine concentration meter 90 and an oxidation-reduction potentiometer 91 serving as a means for measuring the hydrogen peroxide concentration are set in the sixth water tank 66. Then, an openness of the solenoid valve 83 provided on the way of the loop piping 84 is controlled by a signal derived from the fluorine concentration meter 90, so that the supply amount of slaked lime to the fourth water tank 64 is controlled.

The sludge accumulated at the bottom part of the sixth water tank 66 is passed through a sludge piping 92 provided at the bottom so as to be introduced to the seventh water tank 67 serving as a thickened anaerobic microorganism culture tank. The thickened sludge in which anaerobic microorganisms have been thickened and cultured in this seventh water tank 67 is scraped up to the center of the bottom part by the scraper 89, passes through a sludge piping 94 provided at the bottom part and is forcedly fed by a pump 95 to a filter press 70 which is a kind of dehydrator. Then, the sludge is dehydrated by the filter press 70. In addition, one end of a sludge return pipe 99 on which a pump 98 is interveniently provided is connected to the sludge piping 94 derived from the seventh water tank 67 so that the thickened sludge can be returned to the fourth water tank 64 serving as a reaction tank. Also, the sludge piping 92 derived from the sixth water tank 66 and the sludge return pipe 99 are communicated with each other by a sludge return pipe 96 on which a pump 97 is interveniently provided, so that the sludge of the sixth water tank 66 can be returned to the fourth water tank 64. Then, the pump 98 for returning the thickened sludge is controlled together with the second pump 73 for introducing the organic-matter-containing waste water directed toward the third water tank 63 are inverter controlled for their discharge amount by a signal from the oxidation-reduction potentiometer 91. Thus, sludge in which anaerobic microorganisms have been cultured so as to be enriched is returned to the reaction tank, by which the treatment of hydrogen peroxide with anaerobic microorganisms in the reaction tank can be achieved with high efficiency.

That is, with the waste water treatment equipment in this embodiment, the calcium carbonate mineral 76 is filled in the third water tank 63 as a calcium source, so that the fluorine in the treatment water and calcium are made to react. Then, the treatment water containing the generated calcium fluoride 77 is aerated and stirred so that aerobic microorganisms are propagated, by which organic matters are treated. After these processes, in the fourth water tank 64, the treatment of hydrogen peroxide with anaerobic microorganisms in the return sludge from the sixth water tank 66 or the seventh water tank 67, the treatment of phosphorus with slaked lime newly added in a small amount, and secondary treatment (advanced treatment) of fluorine that has already been subjected to primary treatment in the third water tank 63 are carried out. Then, flocs are coagulated in the succeeding fifth water tank 65 and settled and separated in the sixth water tank 66, and the supernatant liquid is discharged as treated water.

The waste water treatment equipment of the above constitution operates as follows.

First, the first pump 71 is driven so that hydrogen-peroxide- and phosphorus-containing fluorine waste water is allowed to flow horizontally and evenly into the lower tank 63$b$ of the third water tank 63 through the inlet pipe 72, reacting with the calcium carbonate mineral 76 to generate calcium fluoride 77. When this occurs, aeration air is discharged evenly into the lower tank 63$b$ through the air diffuser 75, so that the above reaction is accelerated by stirring.

The calcium carbonate mineral 76, having a diameter of about 0.5 mm, is filled in a large amount. Then, the surface of the calcium carbonate mineral 76 is dissolved by the acidic treatment water so that calcium ions are eluted, in which process the eluted calcium ions and the fluorine in the treatment water chemically react to generate calcium fluoride 77.

The treatment water coming through the inlet pipe 72 is mixed with air discharged through the air diffuser 75, and goes up toward an upper tank 73$a$. In this way, aeration air is introduced into the upper tank 63$a$, causing the treatment water in the upper tank 63$a$ to be stirred and causing the calcium carbonate mineral 76 to be fluidized simultaneously. Accordingly, the calcium carbonate mineral 76 is allowed to make vigorous contact with the treatment water so that its chemical reaction with the fluorine in the treatment water is accelerated, thus ensuring the treatment of fluorine. Also, there are some cases where microorganisms are generated at the surface of the fluidized calcium carbonate mineral 76. In such a case, microorganisms are peeled off by the aeration air, resulting in microbial sludge 100. Accordingly, the calcium carbonate mineral 76 and the treatment water exhibit sufficient contact reaction in a fluidized state.

Meanwhile, the calcium carbonate mineral 76 in the lower tank 63$b$ is also fluidized by air discharged from the air diffuser 75. In this case, the fluidization of the calcium carbonate mineral 76 in the lower tank 63$b$ is weaker than that in the upper tank 63$a$ because the calcium carbonate mineral 76 has a specific gravity as heavy as 2.7 and is filled to a large amount in the lower tank 63$b$. However, since a large amount of calcium carbonate mineral 76 is present and the pH of the treatment water is low, an enormous amount of calcium ions are eluted from the calcium carbonate mineral 76, the fluorine in the treatment water and the calcium ions in the calcium carbonate mineral 76 react with certainty despite the weak fluidization.

The specific gravity of the thus generated calcium fluoride 77 is smaller than the specific gravity of the calcium carbonate mineral 76 (2.7). Accordingly, the calcium fluoride 77 that has passed under the separating wall 78 to enter into the separation chamber 79 then passes from an upper layer of the separation chamber 79 through the outflow pipe 81, forming inorganic sludge and flowing into the fourth water tank 64. In contrast to this, the calcium carbonate mineral 76 of large specific gravity, even after entering the separation chamber 79, lowers slowly on the inclined wall 80 to turn back to the lower tank 63$b$.

In this connection, the amount of filled calcium carbonate mineral 76, although differing depending on the fluorine concentration in the treatment water, is around a target of about 50% or lower of the overall capacity of the third water tank 63. Further, the amount of calcium carbonate mineral 76 is set so as to be maintained for more than one month after the introduction of the treatment water. By doing so, the resupplying frequency of the calcium carbonate mineral 76 is lessened, which allows the maintenance cost to be reduced. The amount of consumption of calcium ions out of the calcium carbonate mineral 76 per day in this case is such an amount that the overall amount of acidic components of the fluorine ions, sulfuric acid ions and the like that flow in per day are neutralized. In this embodiment, as described above, a large amount of calcium carbonate mineral 76 are filled so as to allow the one month or more maintenance. Accordingly, even if the degree of acidity of the treatment water has changed, the change can be absorbed sufficiently.

The calcium fluoride 77 is a substance which naturally exists as fluorite. Accordingly, microorganisms are more likely to propagate in the calcium fluoride 77. Also, the calcium fluoride 77 form flocs and so has a property of entrapping the microorganisms (so-called entrapping immobilization), so that even if hydrogen peroxide having bactericidal property is present in the treatment water, microorganisms are propagable. In addition, the calcium fluoride 77 that has entrapped and immobilized microorganisms has permeability to organic matters. Therefore, the organic matters are effectively treated by the entrapped and immobilized aerobic microorganisms.

The amount of air discharged from the air diffuser 75 is desirably set to 80 m$^3$ or more per day for every capacity 1 m$^3$ of the upper tank 63$a$. With an extremely small amount of the discharged air, the calcium carbonate mineral 76 being as heavy as 2.7 could not be fluidized reliably.

The treatment water is introduced to the lower tank 63$b$ through the inlet pipe 72 and sufficiently reacts with the calcium carbonate mineral 76 mainly the lower tank 63$b$. Accordingly, the treatment water in the upper tank 63$a$ has been sufficiently neutralized. Also, the upper tank 63$a$ is in the aeration state as described above, thus being kept sufficiently aerobic. Then, as described above, despite the presence of hydrogen peroxide having bactericidal property, the generated calcium fluoride 77 entraps and immobilizes microorganisms. Therefore, aerobic microorganisms are propagable with organic matters in the treatment water as a nutrient, so that the organic matters in the treatment water are treated resultantly. In addition, aerobic microorganisms can be more propagated by increasing the amount of organic-matter-containing waste water that are introduced from the second water tank 62.

The ascending rate of the treatment water directed from the lower tank 63$b$ toward the upper tank 63$a$ is determined depending on the amount of the calcium carbonate mineral 76 filled in the third water tank 63 as well as on the water quality of the hydrogen-peroxide- and phosphorus-containing fluorine waste water, and a value of 1 m per hour may be referenced. This ascending rate is generally equal to the ascending rate in the activated carbon adsorption tower in normal water treatment.

As described above, in the upper tank 63$a$, the calcium carbonate mineral 76 is fluidized and stirred with good efficiency by aeration with the air diffuser 75. Then, the calcium carbonate mineral 76 with a specific gravity of 2.7 that has entered the separation chamber 79 returns to the lower tank 63b along the inclined wall 80. In this way, the calcium carbonate mineral 76 has returned to the lower tank 63b ascends again toward the upper tank 63a together with aeration bubbles. Like this, the calcium carbonate mineral 76 circulates and moves over and over again within the third water tank 63, thus reacting with the fluorine in the treatment water efficiently.

In this embodiment, the particle size of the calcium carbonate mineral 76 to be filled is set to 0.5 mm or less. Accordingly, the calcium carbonate mineral 76 has wider surface area so as to be reactable efficiently with fluorine. Also, setting the particle size of the calcium carbonate mineral 76 to 0.5 mm or less allows an easier retention of an equilibrium relation with the aeration by the air diffuser 75 in the upper tank 63a. Therefore, in the third water tank 63, a state that the calcium carbonate mineral 76 is fluidized is formed in a wide range. The equilibrium relation herein refers to a state that the fluidized state is maintained at all times by aeration without allowing the calcium carbonate mineral 76 to fast settle.

An amount at which the calcium carbonate mineral 76 is stored in the upper tank 63a and the lower tank 63b of the third water tank 63 (the concentration of calcium carbonate mineral 76 is determined by this storage amount) should be determined depending on the concentration of inflow fluorine in the treatment water. Also, the retention time of treatment water should be determined depending on the concentration of inflow fluorine. In this embodiment, given a fluorine concentration of 30 ppm–300 ppm, the retention time in the upper tank 63a is set to 1 hour or more and the retention time in the lower tank 63b is set to 1 hour or more, including a safety factor. That is, the retention time in total at the third water tank 63 except the separation chamber 79 is set to 2 hours or more.

As shown above, by selecting a calcium carbonate mineral 76 having a particle size of 0.5 mm or lower, and by setting the retention time of the treatment water in the third water tank 63 to 2 hours or more, the fluorine within the treatment water can be reliably treated.

The calcium carbonate mineral 76 is generally commercially available, and so adopting commercially available products is most economical. Commercially available calcium carbonate minerals with particle size 1 mm or 0.5 mm or so are most inexpensive, and their unit price increases with increasing particle size. Accordingly, in view of reaction efficiency and cost, the particle size of the calcium carbonate mineral 76 is preferably 2 mm or less. Although differing depending on the water quality, it is necessary in some cases to take 6 hours or more reaction time at the third water tank 63 if the particle size is large than 2 mm, where the third water tank 63 would increase in size, causing the initial cost for tanks to increase.

As described above, inorganic sludge comprising the calcium fluoride 77 as well as the microbial sludge 100, which have passed under the separating wall 78 to enter the non-aerating separation chamber 79 have specific gravity close to 1 so as to be separated from the calcium carbonate mineral 76 and flow out to the separation chamber 79, flowing into the fourth water tank 64.

The fourth water tank 64 is a reaction tank, where the phosphorus in the treatment water is coupled with calcium derived from the slaked lime added from the slaked lime tank 68 so as to be treated as calcium phosphate. Also, the fluorine remaining in the treatment water transforms into calcium fluoride, so that slaked lime is subjected to advanced treatment of fluorine in succession to the treatment in the third water tank 63.

Since the slaked lime is added in a slurry state, most of the slaked lime flows out from the fourth water tank 64, resulting in unreacted slaked lime. However, its addition amount may such one that the pH of the treatment water that has already been subjected to fluorine treatment by the calcium carbonate mineral 76 is elevated, for example, from "4" to "8". Accordingly, in comparison with the conventional waste water treatment method in which fluorine is treated only with slaked lime, this method only necessitates markedly smaller amount of slaked lime. Also, as described above, unreacted slaked lime that has flowed out together with the treatment water from the fourth water tank 64 is returned from the sixth water tank 66 to the fourth water tank 64 together with sludge by the sludge return pipes 96, 99, and then recycled. In this way, the amount of use of slaked lime is reduced so that the generation of sludge is minimized.

In addition, the sludge returned from the sixth water tank 66 through the sludge return pipes 96, 99 is mixed sludge of inorganic sludge and microbial sludge, and in particular, anaerobic microorganisms are propagated in the microbial sludge, because this sludge is circulated through the water tanks without aeration function (fourth water tank 64 to sixth water tank 66). The reason that the anaerobic microorganisms are propagated could be attributed to the following facts:

(1) A trace amount of organic matters are present in the treatment water. These organic matters include not only organic matters contained in the treatment water but also organic matters derived from the high molecular coagulants which are added in the fifth water tank 65 and returned;

(2) A calcium fluoride which is a natural component is present;

(3) Aerobic microorganisms are propagated in the third water tank 63, and the resulting aerobic microorganisms flow into the fourth water tank 64 and consumes oxygen, causing a more anaerobic state so that aerobic microorganisms die and anaerobic microorganisms each propagated by eating these dead microorganisms.

(4) The capacity of tanks having no aerobic property is sufficient.

Then, the anaerobic microorganisms generally have a reducing property as well as a denitrification property to the treatment water. Therefore, hydrogen peroxide as an oxidizer in the treatment water can be decomposition treated.

It is empirically known that phosphorus in the treatment water reacts with calcium originating from the slaked lime to form calcium phosphate. However, phosphorus will not react so much with calcium eluted from the calcium carbonate mineral mixed in the treatment water. This has been proved by experiment.

Thus, in the fourth water tank 64, phosphorus and hydrogen peroxide in the treatment water are treated and the treatment water in which fluorine has been subjected to advanced treatment flows out to the fifth water tank 65 serving as a coagulating tank.

In the fifth water tank 65 as a coagulating tank, high molecular coagulants are added from the high molecular coagulant tank 69. Then, minute calcium fluoride and calcium phosphate in the treatment water are formed into large flocs, becoming more likely to settle and flowing into the sixth water tank 66.

The settling time in the sixth water tank 66 is set to 3 hours or more. In this sixth water tank 66, inorganic sludge (calcium fluoride and unreacted slaked lime) that has settled at the tapered bottom portion and microbial sludge are scraped together by the scraper 89, where supernatant is separated from inorganic sludge and microbial sludge. Then, the supernatant is sent out as treated water.

The retention time (settling time) at the sixth water tank 66 is far longer than the retention time at the separation chamber 79 of the third water tank 63 (within 0.5 hour), so that the calcium fluoride 77 and microbial sludge 100 that have not settled or have not been separated at the separation chamber 79 as well as the unreacted slaked lime also settle here.

The inorganic sludge and microbial sludge that have settled at the sixth water tank 66 in this way are introduced to the seventh water tank 67. This seventh water tank 67 is a thickened anaerobic microorganism culturing tank, where the treatment sludge is retained for 5 hours or more. Then, the inorganic sludge and the microbial sludge principally composed of calcium fluoride and unreacted slaked lime are thickened and cultured slowly with time in an absence-of-oxygen state, i.e., an anaerobic state. The inorganic sludge and microbial sludge thus thickened and cultured, when unnecessary to return to the fourth water tank 64, are forcedly fed to the filter press 70 by the pump 95 and dehydrated.

The filter press 70 is a dehydrator of relatively strong dehydrating property, and a dehydrated cake with water content below 65% is obtained. It is noted that the amount of sludge obtained by the filter press 70 can be made far smaller, as compared with the conventional waste water treatment method in which large amounts of slaked lime and coagulants are used without using the calcium carbonate mineral 76.

In addition, the sludge in the seventh water tank 67 serving as a thickened anaerobic microorganism culturing tank exhibits blackish gray due to the propagation of sulfate-reducing bacteria based on sulfate ions in the treatment water and besides odor unique to anaerobic microorganisms. Accordingly, depending on the color and odor of the sludge, it can be determined whether or not anaerobic reducing bacteria have been propagated in the sludge. Further, in comparison between the sludge of the sixth water tank 66 and the sludge of the seventh water tank 67, the sludge of the seventh water tank 67 is more blackish and more odorous. Accordingly, it can be seen that the sludge is made more anaerobic in the seventh water tank 67 than in the sixth water tank 66. It is noted that the odor of this sludge is other than pollution-causing one.

In this embodiment, the fluorine concentration meter 90 is attached to the sixth water tank 66. Then, when the fluorine concentration of the treatment water in the sixth water tank 66 has risen above a specified value, the openness of the solenoid valve 83 provided on the loop piping 84 that feeds slaked lime from the slaked lime tank 68 to the fourth water tank 64, causing the feed amount of slaked lime to increase, under control of an adjustment meter based on a signal from the fluorine concentration meter 90. In this way, the advanced treatment of residual fluorine is more activated so that the fluorine concentration of the treatment water is lowered to the specified value.

Also, in the sixth water tank 66, the oxidation-reduction potentiometer 91 serving as a means for measuring the hydrogen peroxide concentration is attached. Then, based on a signal from this oxidation-reduction potentiometer 91, the pump 98 of the sludge return pipe 99 leading from the seventh water tank 67 to the fourth water tank 64 as well as the second pump 73 for introducing organic-matter-containing waste water from the second water tank 62 to the third water tank 63 are inverter controlled. Accordingly, in proportion to the hydrogen peroxide concentration at the sixth water tank 66 as a settling tank, the amount of reducible microbial sludge returned from the seventh water tank 67 to the fourth water tank 64 increases so that hydrogen peroxide is treated more effectively. Further, because much waste water containing such organic matters as alcohol, acetone and IPA and the like flows from the second water tank 62 into the third water tank 63, aerobic microorganisms are more propagated with the organic matters as a nutrient, so that large amounts of oxygen is consumed. However, because of the constant discharge amount of the blower 74, the interior of the third water tank 63 becomes more anaerobic by a degree corresponding to the extra consumption of oxygen. Thus, there occurs a situation that the anaerobic microorganisms are more likely to propagate, where at the time point when the treatment water is introduced from the third water tank 63 to the fourth water tank 64, anaerobic microorganisms increase by a synergistic effect with the increased amount of reducible microbial sludge returned by the pump 98. Thus, the reduction by anaerobic microorganisms is increased so that the hydrogen peroxide is more decomposed.

As described above, according to the waste water treatment equipment of this embodiment, the calcium carbonate mineral 76 used for fluorine treatment at the third water tank 63 is resupplied at lower frequency, being lower in price as compared with the slaked lime involved in the conventional fluorine treatment. Also, the slaked lime is added only in small amounts for the purposes of treating phosphorus in the fourth water tank 64 and advancedly treating residual fluorine. Accordingly, the running cost can be made lower than the conventional counterpart. Further, in the waste water treatment equipment of this embodiment, slurried slaked lime is small in amount of management, and the generation of sludge is also small. Therefore, maintenance for the pump 82 and the loop piping 84 for addition of slaked lime, the filter press 70, the fourth water tank 64 to the seventh water tank 67 and the like can be lessened, compared with the conventional counterpart.

Thus, this waste water treatment equipment is enabled to simultaneously treat hydrogen-peroxide- and phosphorus-containing fluorine waste water and organic-matter-containing waste water with lower running cost and lower maintenance cost.

In addition, in this embodiment, when the amount of air discharged from the air diffuser 75 of the third water tank 63 is set to 120 m³ per day for every 1 m³ capacity of the upper tank 63a, normal treatment of fluorine concentration is enabled. Accordingly, given 200 m³ or more discharge amount of the air diffuser 75, reaction between the calcium carbonate mineral 76 and the fluorine in the treatment water is accelerated so that the fluorine removal rate can be enhanced.

Also, in this embodiment, by controlling the discharge amount of the pump 98 of the sludge return pipe 99 from the seventh water tank 67 to the fourth water tank 64 as described above, the amount of microorganisms that propagate in the fourth water tank 64 serving as a reaction tank, and the fifth water tank 65 serving as a coagulant tank can be controlled.

FIG. 2A shows a treatment timing chart at the individual tanks with ordinary concentrations of hydrogen peroxide, phosphorus and fluorine. FIG. 2B shows a treatment timing chart in the individual tanks with low concentrations of hydrogen peroxide, phosphorus and fluorine.

(Second Embodiment)

FIG. 3 is an arrangement view of waste water treatment equipment of this embodiment. This waste water treatment equipment has an arrangement in which the sludge return pipe 96 and the pump 97 from the sixth water tank 66 to the fourth water tank 64 in the waste water treatment equipment of the first embodiment shown in FIG. 1 have been removed.

A first water tank 101, a second water tank 102, a third water tank 103, a fourth water tank 104, a fifth water tank 105, a sixth water tank 106, a seventh water tank 107, a slaked lime tank 108, a high molecular coagulant tank 109 and a filter press 110 have the same constitutions and operate in the same manners as the first water tank 61, the second water tank 62, the third water tank 63, the fourth water tank 64, the fifth water tank 65, the sixth water tank 66, the seventh water tank 67, the slaked lime tank 68, the high molecular coagulant tank 69 and the filter press 70 shown in FIG. 1. Also, as in the first embodiment, thickened sludge can be returned from the seventh water tank 107 to the fourth water tank 104 through sludge return piping 111 on which a pump 112 is interveniently provided. Further, as in the first embodiment, the openness of a solenoid valve 114 for supplying the fourth water tank 104 with slaked lime derived from the slaked lime tank 108 by a signal from a fluorine concentration meter 113 attached to the sixth water tank 66. Further, a second pump 116 for introducing organic-matter-containing waste water from the second water tank 102 to the third water tank 103, and a pump 112 for returning thickened sludge from the seventh water tank 107 to the fourth water tank 104 are inverter controlled by a signal from an oxidation-reduction potentiometer 115 attached to the sixth water tank 66.

Sludge return in this embodiment is done only from the seventh water tank 107 to the fourth water tank 104 by the pump 112. In the first embodiment, in comparison between the concentration of sludge returned from the seventh water tank 67 to the fourth water tank 64 by the pump 97 and the concentration of sludge returned from the seventh water tank 67 to the fourth water tank 64 by the pump 98, the sludge returned from the seventh water tank 67 to the fourth water tank 64 by the pump 98, which has been thickened, is markedly higher in concentration than the other. Accordingly, stopping the return of the sludge from the sixth water tank 66 to the fourth water tank 64 by the pump 97 causes no great change in the capability for treating hydrogen peroxide, phosphorus, fluorine and organic matters.

Therefore, in this embodiment, by eliminating the means for returning sludge from the sixth water tank 106 to the fourth water tank 104, waste water treatment equipment having an ability for treating hydrogen peroxide, phosphorus, fluorine and organic matters equivalent to the waste water treatment equipment of the first embodiment is realized with lower cost.

(Third Embodiment)

Figure 4:
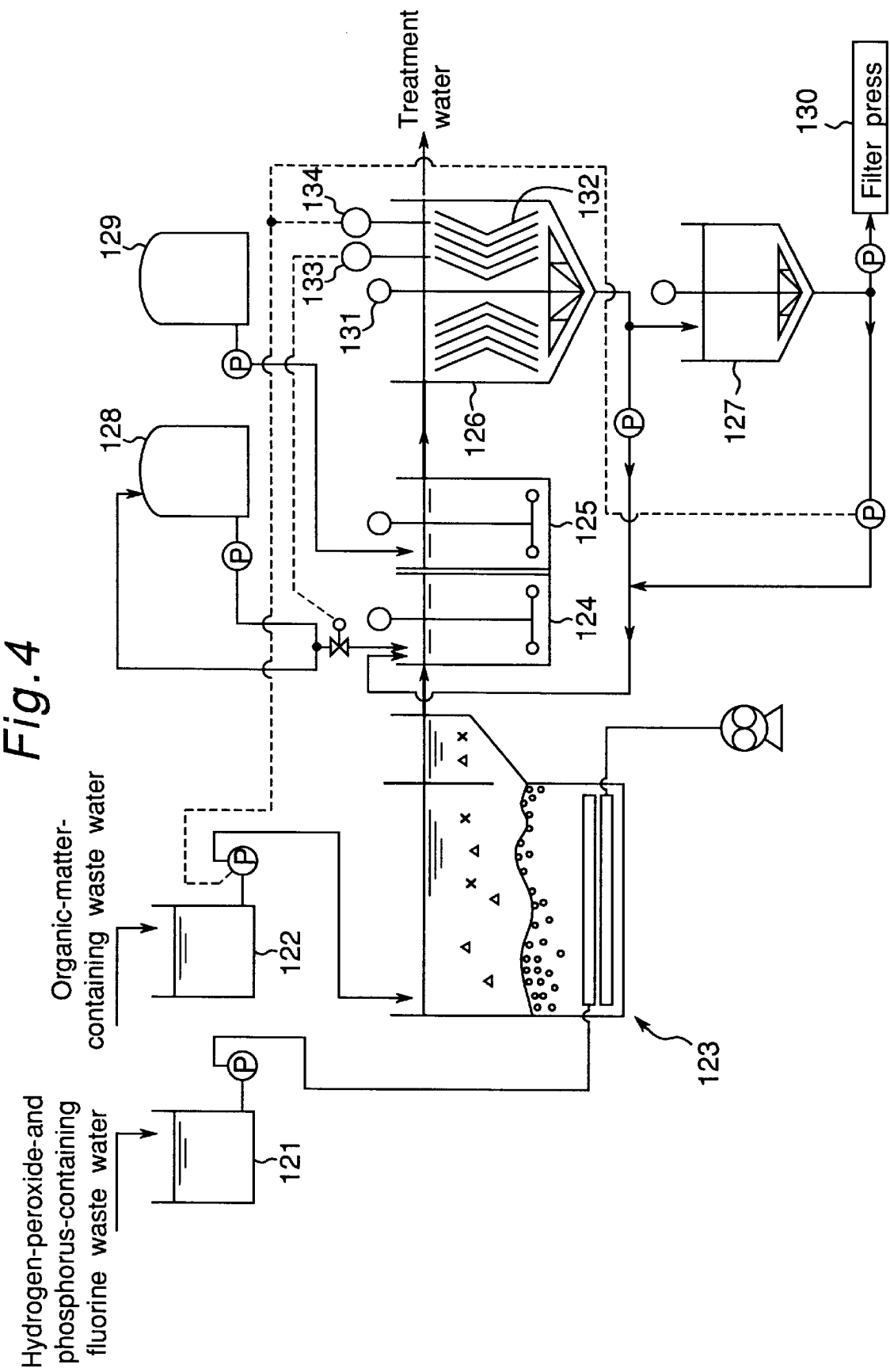
FIG. 4 is an arrangement view of waste water treatment equipment other than FIG. 1 and FIG. 3.

FIG. 4 is an arrangement view of waste water treatment equipment of this embodiment. This waste water treatment equipment differs in the structure of the sixth water tank 66 from the waste water treatment equipment of the first embodiment shown in FIG. 1.

A first water tank 121, a second water tank 122, a third water tank 123, a fourth water tank 124, a fifth water tank 125, a seventh water tank 127, a slaked lime tank 128, a high molecular coagulant tank 129 and a filter press 130 have the same constitutions and operate in the same manners as the first water tank 61, the second water tank 62, the third water tank 63, the fourth water tank 64, the fifth water tank 65, the sixth water tank 66, the seventh water tank 67, the slaked lime tank 68, the high molecular coagulant tank 69 and the filter press 70 shown in FIG. 1.

The sixth water tank 126 as a settling tank in this embodiment has a scraper 131 as in the sixth water tank 66 in the first embodiment, so that settled sludge is scraped together to bottom center part. Also, in the sixth water tank 126, a plurality of cylindrical inclined plates 132 each having a cross section with its axial central portion bent toward the center are set in a concentric state. These inclined plates 132, each of which is formed from a polyvinyl chloride plate, are arranged radially with specific intervals.

Calcium fluoride generated by reaction with the calcium carbonate mineral well adheres to polyvinyl chloride plates or the like. Also, anaerobic microorganisms can be easily entrapped and immobilized stably to the calcium fluoride sludge. Therefore, in this embodiment, from the above two points of view, adhesive calcium fluoride containing anaerobic microorganisms is stuck to the inclined plates 132. By doing so, hydrogen peroxide can be treated even more effectively by the anaerobic microorganisms that have propagated in the calcium fluoride sludge stucked to the inclined plates 132. Also, when an ascending water stream is present in the sixth water tank 126, settled matters such as flocs in the treatment water are prohibited from ascending in parallel to the axis by the presence of the inclined plates 132, thus striking against the surfaces of the inclined walls 132. Accordingly, an increased capability for treating suspended matters can be obtained.

In addition, as in the first embodiment, sludge can be returned from the sixth water tank 126 and the seventh water tank 127 to the fourth water tank 124. Also, the supply amount of slaked lime from the slaked lime tank 128 to the fourth water tank 124 is controlled by a signal from a fluorine concentration meter 133 attached to the sixth water tank 126. Further, the amount of organic-matter-containing waste water introduced from the second water tank 122 to the third water tank 123 as well as the amount of sludge returned from the seventh water tank 127 to the fourth water tank 124 are inverter controlled by a signal from an oxidation-reduction potentiometer 134 attached to the sixth water tank 126.

(Fourth Embodiment)

Figure 5:
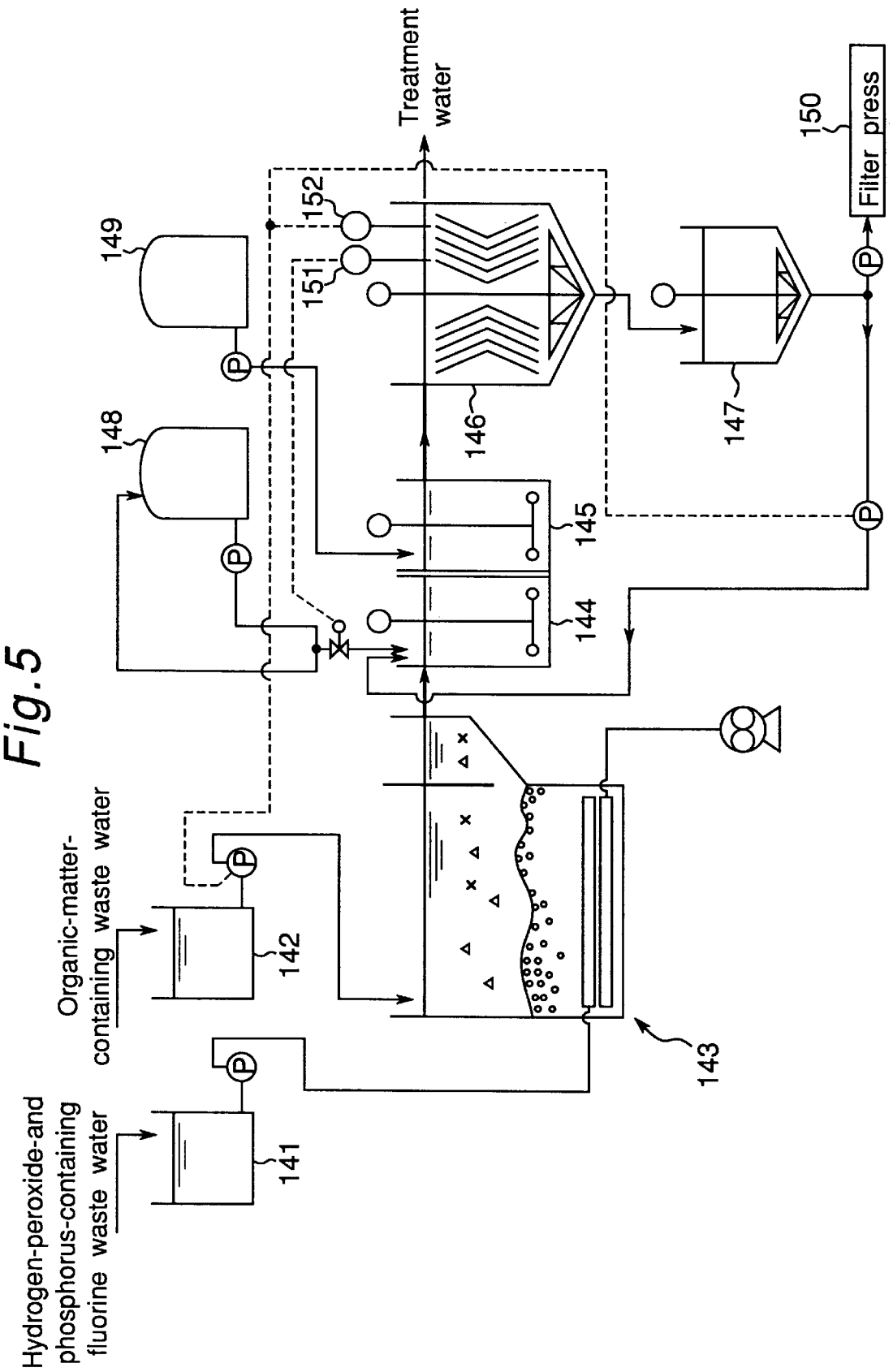
FIG. 5 is an arrangement view of waste water treatment equipment other than FIG. 1, FIG. 3 and FIG. 4.

FIG. 5 is an arrangement view of waste water treatment equipment of this embodiment. This waste water treatment equipment has an arrangement in which the means for returning sludge from the sixth water tank 126 to the fourth water tank 124 in the waste water treatment equipment of the third embodiment shown in FIG. 4 have been removed.

A first water tank 141, a second water tank 142, a third water tank 143, a fourth water tank 144, a fifth water tank 145, a sixth water tank 146, a seventh water tank 147, a slaked lime tank 148, a high molecular coagulant tank 149 and a filter press 150 have the same constitutions and operate in the same manners as the first water tank 121, the second water tank 122, the third water tank 123, the fourth water tank 124, the fifth water tank 125, the sixth water tank 126, the seventh water tank 127, the slaked lime tank 128, the high molecular coagulant tank 129 and the filter press 130 shown in FIG. 4. Also, thickened sludge can be returned from the seventh water tank 147 to the fourth water tank 144 as in the third embodiment.

Sludge return in this embodiment is done only from the seventh water tank 147 to the fourth water tank 144. However, in the third embodiment (FIG. 4), the sludge returned from the seventh water tank 127 to the fourth water tank 124 is markedly higher in concentration than the sludge returned from the sixth water tank 126 to the fourth water tank 124. Accordingly, stopping the return of the sludge from the sixth water tank 126 to the fourth water tank 124 causes no considerable change in the capability for treating hydrogen peroxide, phosphorus, fluorine and organic matters.

Therefore, in this embodiment, by eliminating the means for returning sludge from the sixth water tank 146 to the fourth water tank 144, waste water treatment equipment having an ability for treating hydrogen peroxide, phosphorus, fluorine and organic matters equivalent to the waste water treatment equipment of the third embodiment is realized with lower cost.

Also, the supply amount of slaked lime from the slaked lime tank 148 to the fourth water tank 144 is controlled by a signal from a fluorine concentration meter 151 attached to the sixth water tank 146. Further, the amount of organic-matter-containing waste water introduced from the second water tank 142 to the third water tank 143 as well as the amount of sludge returned from the seventh water tank 147 to the fourth water tank 144 are inverter controlled by a signal from an oxidation-reduction potentiometer 152 attached to the sixth water tank 146.

Figure 6:
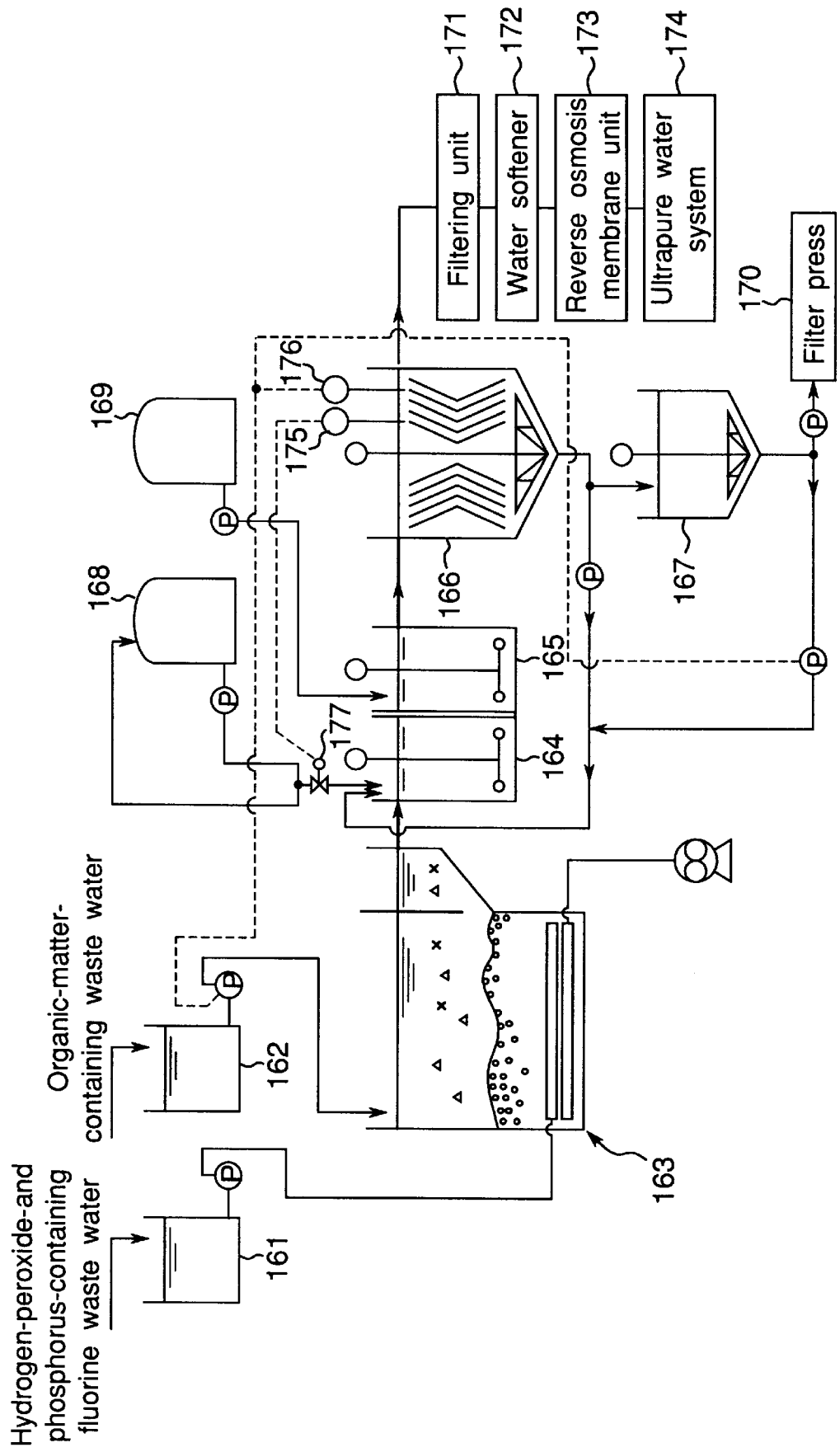
FIG. 6 is an arrangement view of waste water treatment equipment other than FIG. 1 and FIGS. 3 through 5.

FIG. 6 is an arrangement view of waste water treatment equipment of this embodiment. A first water tank 161, a second water tank 162, a third water tank 163, a fourth water tank 164, a fifth water tank 165, a sixth water tank 166, a seventh water tank 167, a slaked lime tank 168, a high molecular coagulant tank 169 and a filter press 170 have the same constitutions and operate in the same manners as the first water tank 121, the second water tank 122, the third water tank 123, the fourth water tank 124, the fifth water tank 125, the sixth water tank 126, the seventh water tank 127, the slaked lime tank 128, the high molecular coagulant tank 129 and the filter press 130 shown in FIG. 4.

The waste water treatment equipment in this embodiment further comprises a filter unit 171, a water softener 172, a reverse osmosis membrane unit 173 and an ultrapure water system 174, where treatment water from the sixth water tank 166 is introduced to these units.

Also, the supply amount of slaked lime from the slaked lime tank 168 to the fourth water tank 164 is controlled by a signal from a fluorine concentration meter 175 attached to the sixth water tank 166. Further, the amount of organic-matter-containing waste water introduced from the second water tank 162 to the third water tank 163 as well as the amount of sludge returned from the seventh water tank 167 to the fourth water tank 164 are inverter controlled by a signal from an oxidation-reduction potentiometer 176 attached to the sixth water tank 166.

In this constitution, treatment water discharged from the sixth water tank 166, in which fluorine, phosphorus, hydrogen peroxide and organic matters have been removed, is introduced to the filter unit 171 as treatment water. Then, more or less suspended matters included in the treatment water are removed by the filter unit 171. As the filter medium to be filled in the filter unit 171, anthracite is used. The treatment water from which suspended matters have thus been removed is introduced to the water softener 172. In the water softener 172, principally, calcium ions and the like dissolved in the treatment water are removed. Then, by the reverse osmosis membrane unit 173, the remaining ions, organic matters, microorganisms and the like are removed. In addition, the reverse osmosis membrane unit 173 has a common bactericidal unit, pH controlling unit and microfilter and the like.

As described above, in this embodiment, fluorine, phosphorus, hydrogen peroxide and organic matters are removed by the first water tank 161 to the seventh water tank 167, and suspended matters, residual ions, residual organic matters, microorganisms and the like are removed by the filter unit 171 to the reverse osmosis membrane unit 173. Then, treatment water from which fluorine, phosphorus, hydrogen peroxide, organic matters, suspended matters, residual ions and microorganisms and the like have been removed reliably is introduced to the ultrapure water system 174, so that ultrapure water is obtained.

For this process, in this embodiment, chemicals such as slaked lime and high molecular coagulants added to treat the fluorine and phosphorus in the treatment water are restricted to a required minimum. In particular, slaked lime is used only for the treatment of phosphorus in the treatment water and the advanced treatment of residual fluorine. Therefore, according to this embodiment, the electrical conductivity of supernatant water of the sixth water tank 166 can be made 700 $\mu$s/cm or lower. Thus, the supernatant water of the sixth water tank 166 can be recycled for production of ultrapure water.

(Sixth Embodiment)

Figure 7:
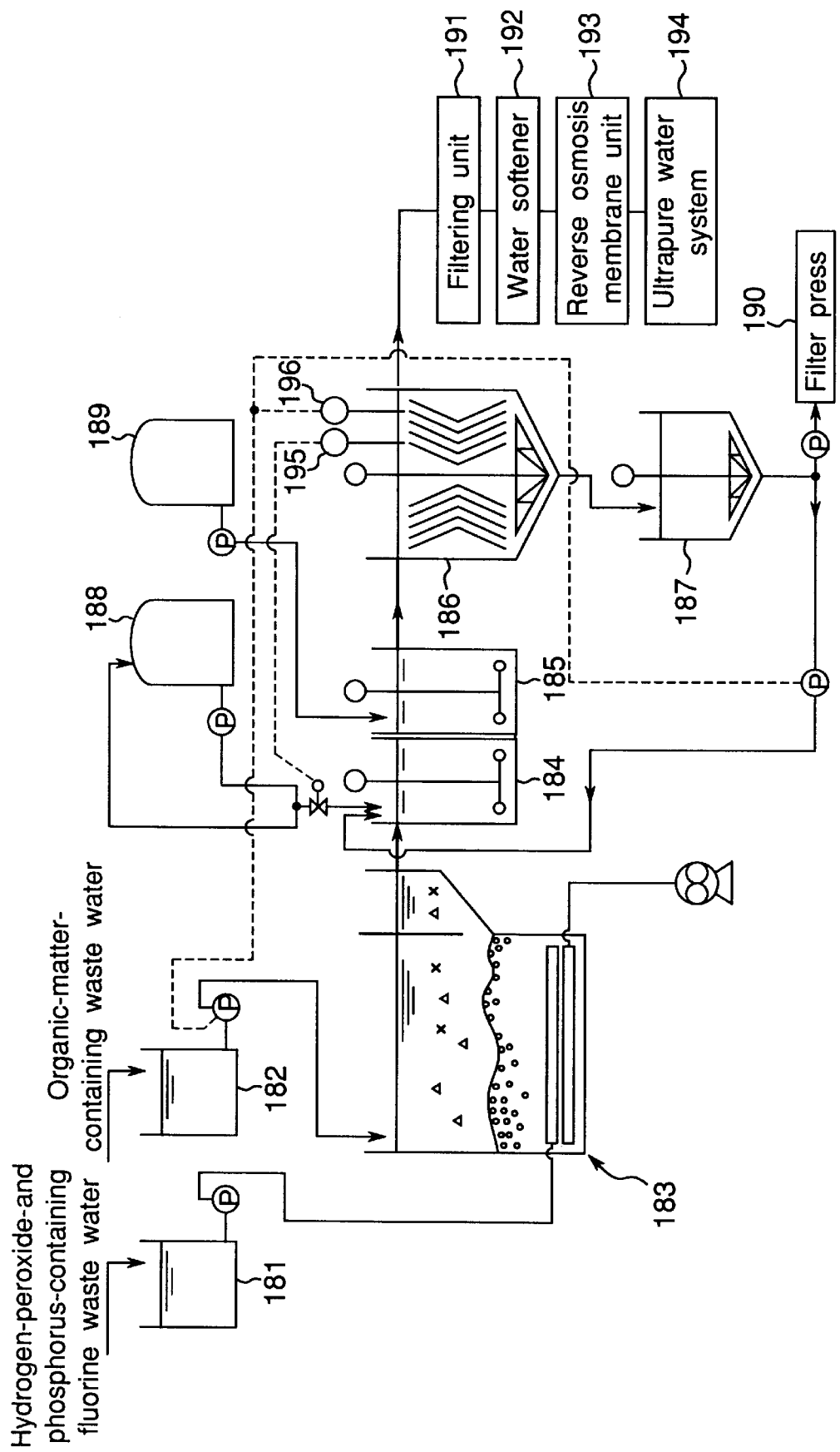
FIG. 7 is an arrangement view of waste water treatment equipment other than FIG. 1 and FIGS. 3 through 6.
Figure 8:
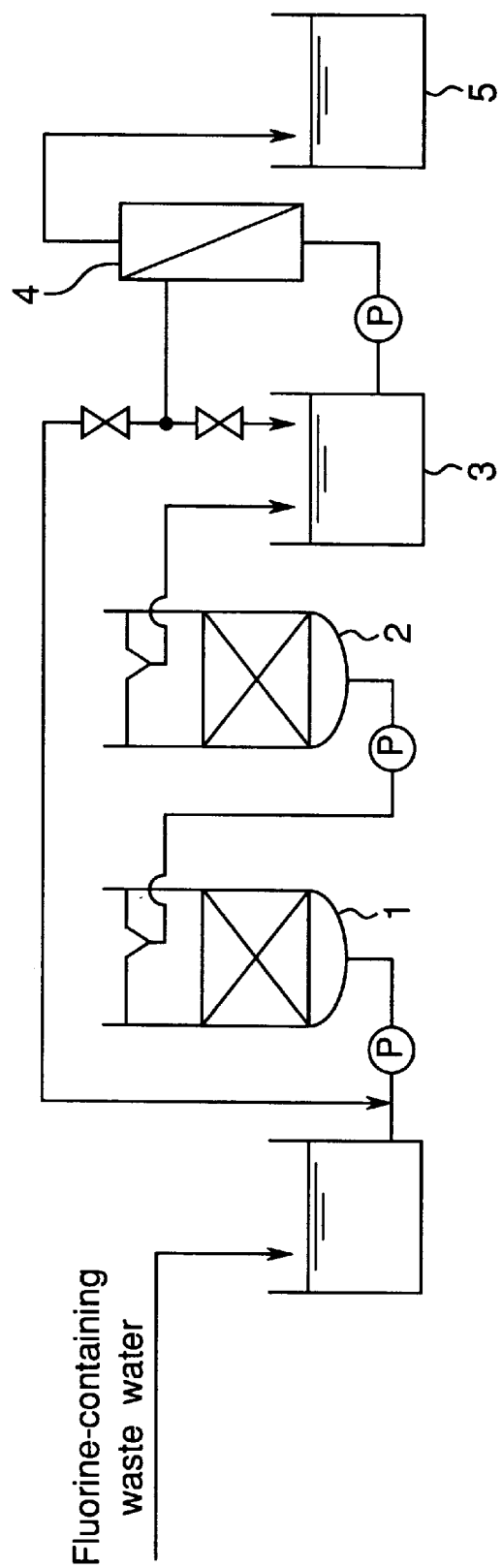
FIG. 8 is a view showing conventional fluorine removal equipment.
Figure 9:
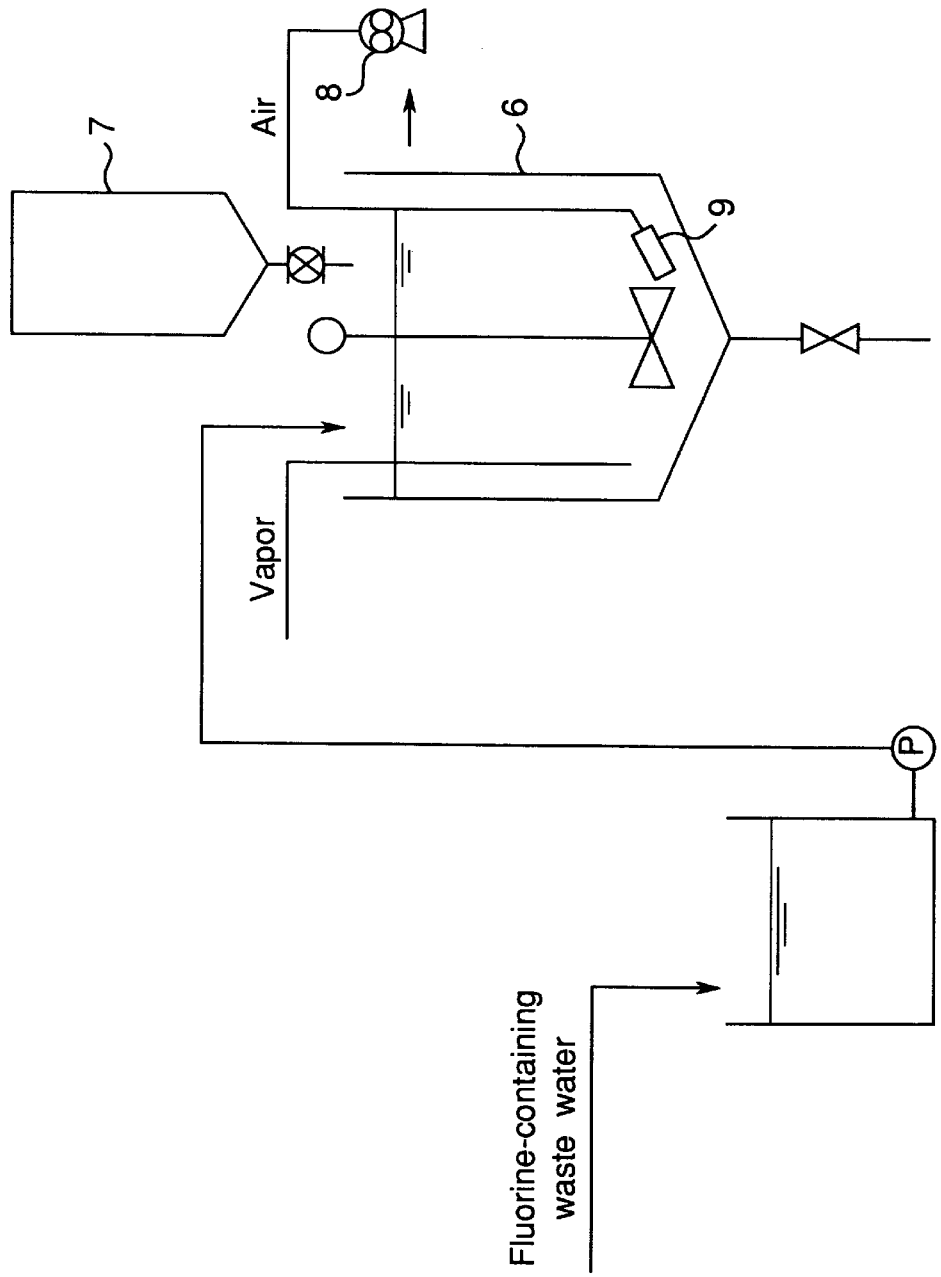
FIG. 9 is a view showing conventional fluorine removal equipment other than FIG. 8.
Figure 10:
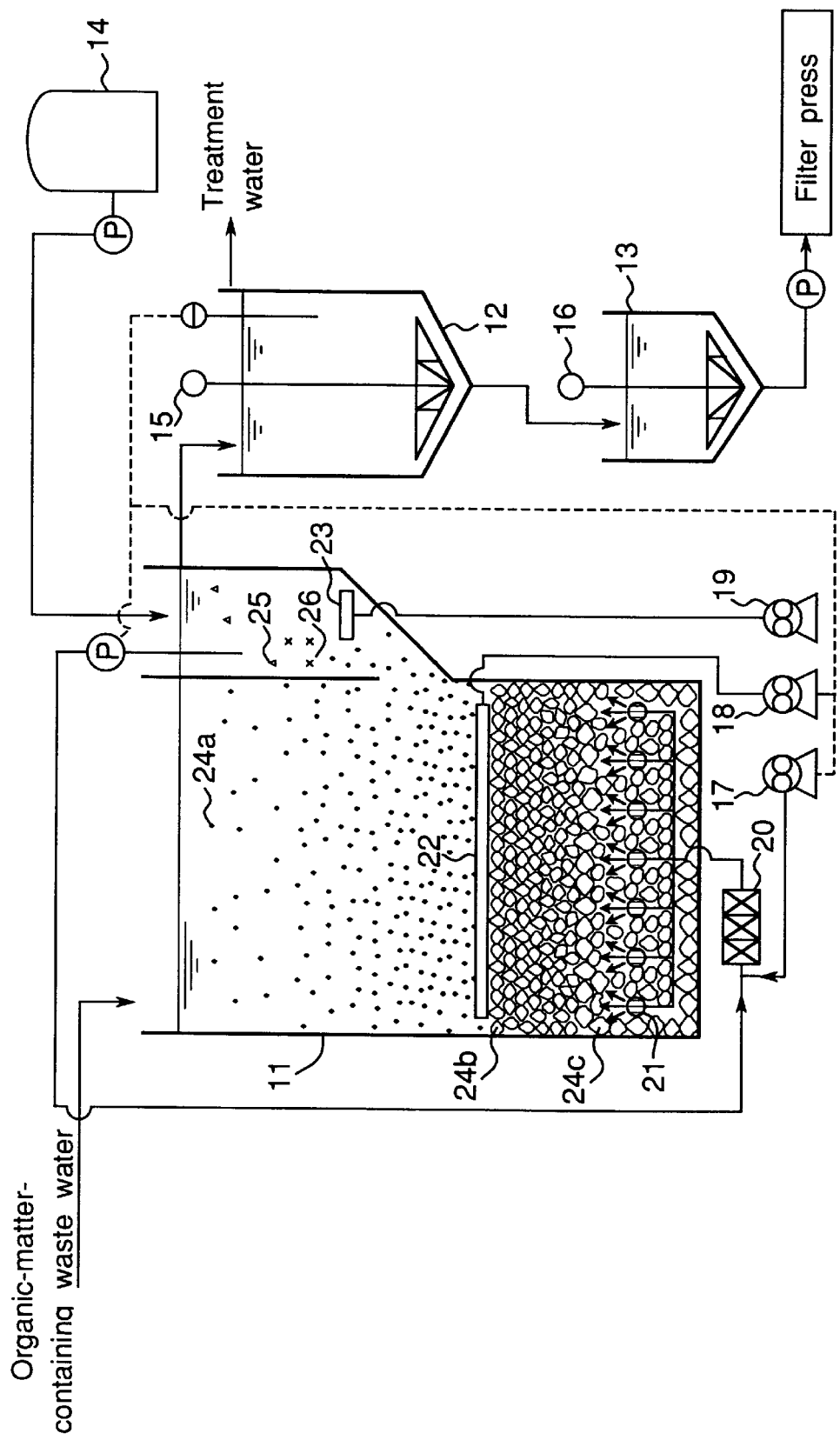
FIG. 10 is a view showing conventional waste water treatment equipment for treating fluorine waste water containing organic matters.
Figure 11:
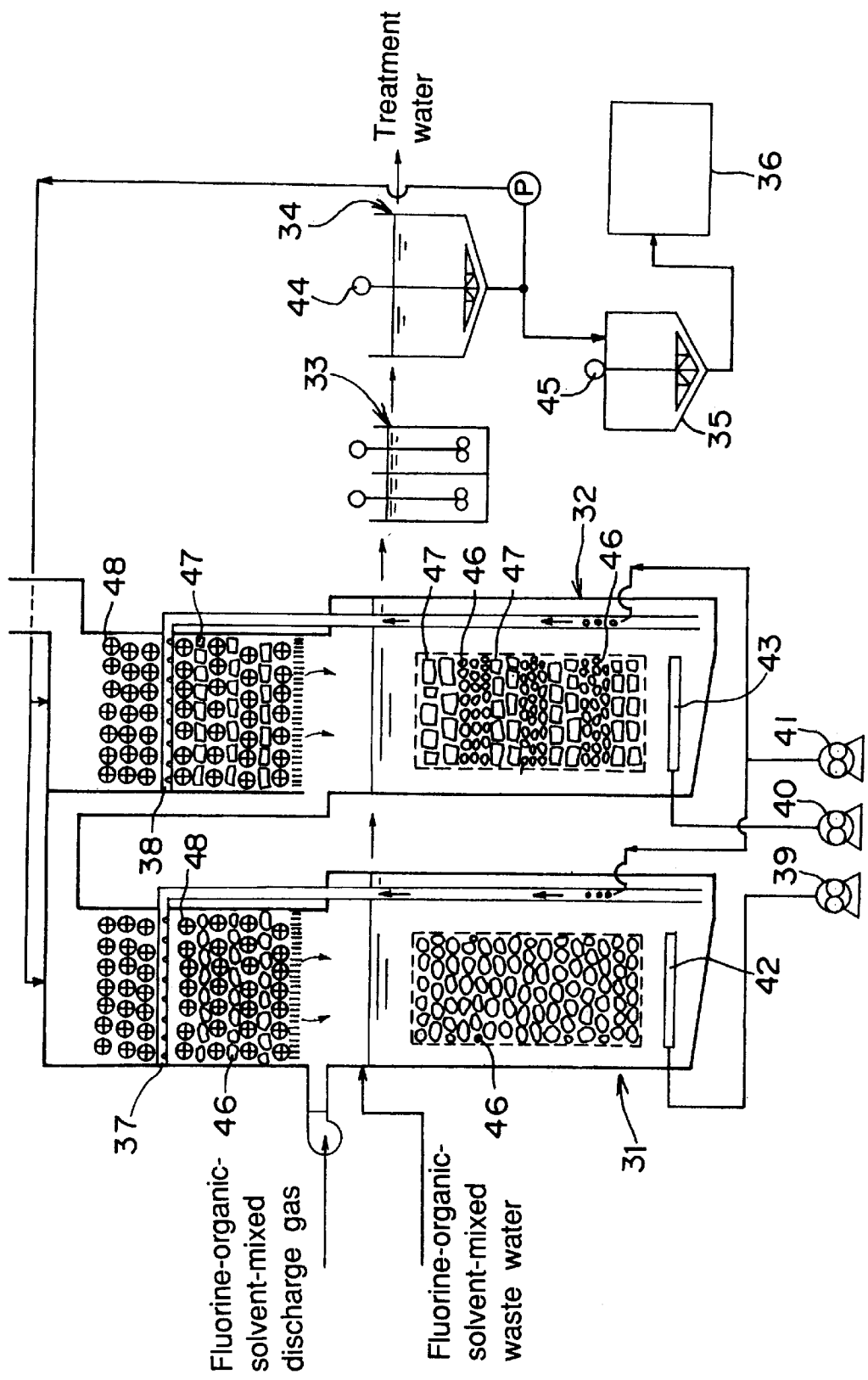
FIG. 11 is a view showing conventional waste water treatment equipment for treating fluorine waste water containing organic matters.
Figure 12:
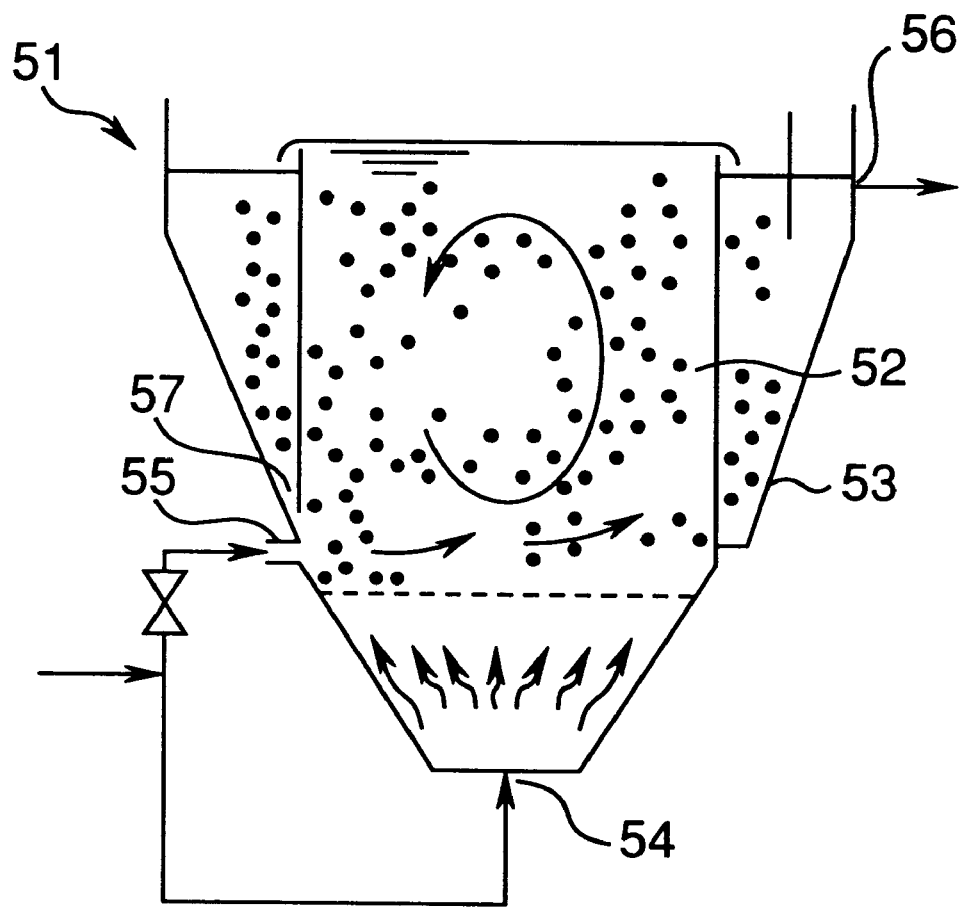
FIG. 12 is a view showing conventional hydrogen peroxide removal equipment.

FIG. 7 is an arrangement view of waste water treatment equipment of this embodiment. This waste water treatment equipment has an arrangement in which the means for returning sludge from the sixth water tank 166 to the fourth water tank 164 has been removed in the waste water treatment equipment of the fifth embodiment shown in FIG. 6.

A first water tank 181, a second water tank 182, a third water tank 183, a fourth water tank 184, a fifth water tank 185, a sixth water tank 186, a seventh water tank 187, a slaked lime tank 188, a high molecular coagulant tank 189, a filter press 190, a filter unit 191, a water softner 192, a reverse osmosis membrane unit 193 and an ultrapure water system 194 have the same constitutions and operate in the same manners as the first water tank 161, the second water tank 162, the third water tank 163, the fourth water tank 164, the fifth water tank 165, the sixth water tank 166, the seventh water tank 167, the slaked lime tank 168, the high molecular coagulant tank 169, the filter press 170, a filter unit 171, a water softner 172, a reverse osmosis membrane unit 173 and an ultrapure water system 174 shown in FIG. 6.

Sludge return in this embodiment is done only from the seventh water tank 187 to the fourth water tank 184. However, in the fifth embodiment (FIG. 6), the sludge returned from the seventh water tank 167 to the fourth water tank 164 is markedly higher in concentration than the sludge returned from the sixth water tank 166 to the fourth water tank 164. Accordingly, stopping the return of the sludge from the sixth water tank 166 to the fourth water tank 164 causes no considerable change in the capability for treating hydrogen peroxide, phosphorus, fluorine and organic matters.

Therefore, in this embodiment, by eliminating the means for returning sludge from the sixth water tank 186 to the fourth water tank 184, waste water treatment equipment having an ability for treating hydrogen peroxide, phosphorus, fluorine and organic matters equivalent to the waste water treatment equipment of the fifth embodiment is realized with lower cost.

Also, the supply amount of slaked lime from the slaked lime tank 188 to the fourth water tank 184 is controlled by a signal from a fluorine concentration meter 195 attached to the sixth water tank 186. Further, the amount of organic-matter-containing waste water introduced from the second water tank 182 to the third water tank 183 as well as the amount of sludge returned from the seventh water tank 187 to the fourth water tank 184 are inverter controlled by a signal from an oxidation-reduction potentiometer 196 attached to the sixth water tank 186.

(Example)

Next, a concrete example of waste water treatment using the above-described waste water treatment equipment is described. The waste water treatment equipment used in this case was waste water treatment equipment having the same constitution as the waste water treatment equipment shown in FIG. 1, where the capacity of the third water tank 63 was about 600 m$^3$, including the capacity of separation chamber 79 being about 150 m$^3$, the capacity of the fourth water tank 64 was about 225 m$^3$, the capacity of the fifth water tank 65 was about 225 m$^3$, the capacity of the sixth water tank 66 was about 900 m$^3$ and the capacity of the seventh water tank 67 was about 100 m$^3$.

By using this waste water treatment equipment, treatment was carried out with mixed waste water of hydrogen-peroxide- and phosphorus-containing fluorine waste water with pH 2.2, hydrogen peroxide concentration 86 ppm, phosphorus concentration 12 ppm and fluorine concentration 183 ppm, and organic-matter-containing waste water with COD 18 ppm. As a result of this, the pH was 7.5, the hydrogen peroxide concentration was 1 ppm (about 1/86 of that prior to treatment), the phosphorus concentration was 1 ppm (about 1/12 of that prior to treatment), the fluorine concentration was 6 ppm (about 1/30 of that prior to treatment) and the COD was 2 ppm (about 1/9 of that prior to treatment)

Next, a concrete example of waste water treatment using waste water treatment equipment having the above-described ultrapure water system is described. The waste water treatment equipment used in this case was waste water treatment equipment having the same constitution as the waste water treatment equipment shown in FIG. 7, where the capacity of the third water tank 183 was about 60 m$^3$, including the capacity of separation chamber being about 15 m$^3$, the capacity of the fourth water tank 184 was about 23 m$^3$, the capacity of the fifth water tank 185 was about 23 m$^3$, the capacity of the sixth water tank 186 was about 90 m$^3$ and the capacity of the seventh water tank 187 was about 10 m$^3$. Also, the capacities of the filter unit 191 and the water softener 192 were about 2 m$^3$, respectively, and the reverse osmosis membrane unit 193 was provided as one unit.

By using this waste water treatment equipment, treatment was carried out with mixed waste water of hydrogen-peroxide- and phosphorus-containing fluorine waste water with pH 2.3, hydrogen peroxide concentration 84 ppm, phosphorus concentration 12 ppm and fluorine concentration 186 ppm, and organic-matter-containing waste water with COD 16 ppm. As a result of this, the pH of the treated water from the reverse osmosis membrane unit 193 was 7.5, the hydrogen peroxide concentration was 0.1 ppm, the phosphorus concentration was 0.1 ppm, the fluorine concentration was 0.2 ppm and the COD was 0.02 ppm. Treatment was also carried out with waste water with electrical conductivity 844 μs/cm. As a result of this, the electrical conductivity of treated water from the reverse osmosis membrane unit 193 was 224 μs/cm or lower, and treated water with electrical conductivity 700 μs/cm or lower, which is recyclable for production of ultrapure water was able to be obtained.

The above embodiments have been described on a case in which hydrogen-peroxide- and phosphorus-containing fluorine waste water and organic-matter-containing waste water are treated simultaneously. However, without being limited to these, the present invention is required only to include a step or equipment for decomposing at least the hydrogen-peroxide-containing waste water with anaerobic microorganisms.

Also, the calcium carbonate mineral 76 to be filled in the third water tank 63, 103, 123, 143, 163, 183 may be other reactive filler materials capable of treating fluorine. The slaked lime to be added to the fourth water tank 64, 104, 124, 144, 164, 184 may be other inorganic coagulants capable of treating phosphorus.

Furthermore, when the seventh water tank 67, 107, 127, 147, 167, 187 as the above thickened anaerobic microorganism culturing tank, although not necessarily necessitated, is installed, hydrogen peroxide can be treated more efficiently with high-concentration anaerobic microorganisms.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A waste water treatment method characterized in that, after introducing hydrogen-peroxide-containing waste water and organic-matter-containing waste water into a first tank, where the mixed waste water is aerated, and then biologically treating the organic matters by means of propagated aerobic microorganisms, introducing the waste water, which has undergone the treatment by the first tank, into a non-aerating second tank into which mixed sludge of anaerobic microorganisms and inorganic sludge has been introduced, and then biologically treating the hydrogen peroxide by means of the anaerobic microorganisms.

2. A waste water treatment method comprising:

a first step for introducing hydrogen-peroxide- and phosphorus-containing fluorine waste water to lower portion of a treatment tank in which reactive filler material has been fluidized in treatment water through aeration by aeration means, while introducing organic-matter-containing waste water to upper portion of the treatment tank so that fluorine is treated through chemical treatment by means of the reactive filler material, and further biologically treating organic matters by means of aerobic microorganisms propagated in a product of the chemical treatment;

a second step for introducing treatment water, which has undergone the first step, into a non-aerating reaction coagulating tank, adding an inorganic coagulant and a high molecular coagulant to thereby treat phosphorus through chemical treatment by the inorganic coagulant, and then coagulating a product of the chemical treatment; and a third step for introducing treatment water, which has undergone the second step, into a settling tank to thereby separate it into supernatant and sludge, and returning separated sludge to the reaction coagulating tank, wherein hydrogen peroxide is treated within the reaction coagulating tank by means of anaerobic microorganisms propagated in the returned sludge.

3. The waste water treatment method according to claim 2, wherein the reactive filler material is calcium carbonate mineral, and the inorganic coagulant is slaked lime.

4. The waste water treatment method according to claim 3, wherein the sludge to be returned is mixed sludge of biological sludge composed principally of the anaerobic microorganisms and calcium fluoride and the slaked lime.

* * * * *